United States Patent
Mundell et al.

(10) Patent No.: US 11,700,836 B2
(45) Date of Patent: Jul. 18, 2023

(54) SYSTEM AND METHOD FOR CHARACTERIZING AND MONITORING HEALTH OF AN ANIMAL BASED ON GAIT AND POSTURAL MOVEMENTS

(71) Applicant: Companion Labs, Inc., San Francisco, CA (US)

(72) Inventors: Paul Mundell, San Francisco, CA (US); Camden Olson, San Francisco, CA (US); Libby Rockaway, San Francisco, CA (US); John Honchariw, San Francisco, CA (US)

(73) Assignee: Companion Labs, Inc., San Francisco, CA (US)

( * ) Notice: Subject to any disclaimer, the term of this patent is extended or adjusted under 35 U.S.C. 154(b) by 0 days.

(21) Appl. No.: 17/886,373

(22) Filed: Aug. 11, 2022

(65) Prior Publication Data
US 2023/0092647 A1   Mar. 23, 2023

Related U.S. Application Data

(63) Continuation-in-part of application No. 17/538,242, filed on Nov. 30, 2021, which is a continuation of
(Continued)

(51) Int. Cl.
*A01K 29/00*   (2006.01)
*A01K 15/02*   (2006.01)

(52) U.S. Cl.
CPC .......... *A01K 29/005* (2013.01); *A01K 15/02* (2013.01)

(58) Field of Classification Search
CPC .. A01K 29/005; A01K 15/021; A01K 11/004; A01K 15/02; A01K 15/027;
(Continued)

(56) References Cited

U.S. PATENT DOCUMENTS 6,263,836 B1   7/2001   Hollis
8,347,817 B1   1/2013   Miller
(Continued)

FOREIGN PATENT DOCUMENTS

CN        1606404 A     4/2005
WO   2006044828 A3   10/2006
(Continued)

OTHER PUBLICATIONS

Final Office Action from U.S. Appl. No. 17/538,242 dated Jul. 29, 2022.
(Continued)

*Primary Examiner* — Peter M Poon
*Assistant Examiner* — Jeffrey R Larsen
(74) *Attorney, Agent, or Firm* — Run8 Patent Group, LLC; Peter Miller; Leah Raddatz

(57) ABSTRACT

One variation of a method includes: accessing a video feed recorded at a training apparatus configured to dispense primary reinforcer units; dispensing a first primary reinforcer unit toward a first location; in response to detecting the animal at the first location, dispensing a second primary reinforcer unit toward a second location intersecting a pathway extending from the first location; in response to detecting movement of the animal along the pathway, collecting a timeseries of position data representing changes in position of a set of anatomical features of the animal; based on the timeseries of position data, deriving a movement profile representing movement of the animal along the pathway; based on a difference between the movement profile and a baseline movement profile defined for the animal, interpreting an abnormality and predicting a causal pathway for the abnormality; and selecting a mitigation protocol based on the causal pathway.

13 Claims, 11 Drawing Sheets

Related U.S. Application Data application No. 16/418,596, filed on May 21, 2019, now Pat. No. 11,576,348.

(60) Provisional application No. 63/231,800, filed on Aug. 11, 2021, provisional application No. 62/674,575, filed on May 21, 2018.

(58) Field of Classification Search
CPC ...... A01K 5/0114; A01K 5/02; A01K 15/025; G06V 40/10; G06V 40/20; G06V 10/764; G06V 40/23; G16H 50/20; G06N 5/02; A63B 2208/14; A63B 2220/806; A61B 2503/40; A61B 5/112
USPC ..... 119/51.02, 421, 712, 908; 382/110, 103, 382/181, 154
See application file for complete search history.

(56) References Cited

U.S. PATENT DOCUMENTS

| | | | | |
|---|---|---|---|---|
| 8,812,430 | B1* | 8/2014 | Thomson | G06N 5/02 706/52 |
| 2004/0131254 | A1 | 7/2004 | Liang et al. | |
| 2005/0145197 | A1 | 7/2005 | Crist et al. | |
| 2006/0011145 | A1 | 1/2006 | Kates | |
| 2006/0011146 | A1 | 1/2006 | Kates | |
| 2006/0081644 | A1 | 4/2006 | Arnold et al. | |
| 2014/0083364 | A1 | 3/2014 | Anderson et al. | |
| 2014/0172460 | A1 | 6/2014 | Kohli | |
| 2014/0289174 | A1* | 9/2014 | Statnikov | G06N 5/04 706/12 |
| 2014/0290583 | A1 | 10/2014 | Yin | |
| 2015/0092978 | A1* | 4/2015 | Wu | G06V 40/23 382/103 |
| 2016/0015004 | A1 | 1/2016 | Bonge, Jr. | |
| 2016/0147959 | A1* | 5/2016 | Mariottini | G16H 50/20 706/46 |
| 2016/0295832 | A1 | 10/2016 | Trottier et al. | |
| 2016/0316716 | A1* | 11/2016 | Hanson | A01K 5/02 |
| 2017/0039301 | A1 | 2/2017 | Mainini et al. | |
| 2017/0196196 | A1 | 7/2017 | Trottier et al. | |
| 2019/0000036 | A1* | 1/2019 | Hong | A01K 5/02 |
| 2019/0174718 | A1 | 6/2019 | Venkat et al. | |

FOREIGN PATENT DOCUMENTS

| | | |
|---|---|---|
| WO | 2014134606 A1 | 9/2014 |
| WO | 2016089596 A1 | 6/2016 |
| WO | 2017193246 A1 | 11/2017 |

OTHER PUBLICATIONS

International Search Report and Written Opinion for International Patent Application No. PCT/US2019/33338, Oct. 17, 2019, 17 pages.
ISR received in PCT/US19/33338 dated Oct. 17, 2019.
Office Action received in Chinese Patent Application No. 2019800487579 dated Jan. 11, 2022.
Office Action received in CN201980048757.9 dated Jul. 5, 2022.
Office Action Received in U.S. Appl. No. 16/418,596 dated Apr. 15, 2021.
Office Action received in U.S. Appl. No. 16/418,596 dated Sep. 13, 2021.
Office Action Received in U.S. Appl. No. 17/538,242 dated Mar. 15, 2022.

* cited by examiner

SYSTEM AND METHOD FOR CHARACTERIZING AND MONITORING HEALTH OF AN ANIMAL BASED ON GAIT AND POSTURAL MOVEMENTS

CROSS-REFERENCE TO RELATED APPLICATIONS

This Application claims the benefit of U.S. Provisional Application No. 63/231,800, filed on 11 Aug. 2021, which is incorporated in its entirety by this reference.

This Application is a continuation-in-part of U.S. patent application Ser. No. 17/538,242, filed on 30 Nov. 2021, which is a continuation of U.S. patent application Ser. No. 16/418,596, filed on 21 May 2019, which claims the benefit of U.S. Provisional Application No. 62/674,575, filed on 21 May 2018, each of which is incorporated in its entirety by this reference.

TECHNICAL FIELD

This invention relates generally to the field of animal training and more specifically to a new and useful system and method for monitoring animal health in the field of animal training.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
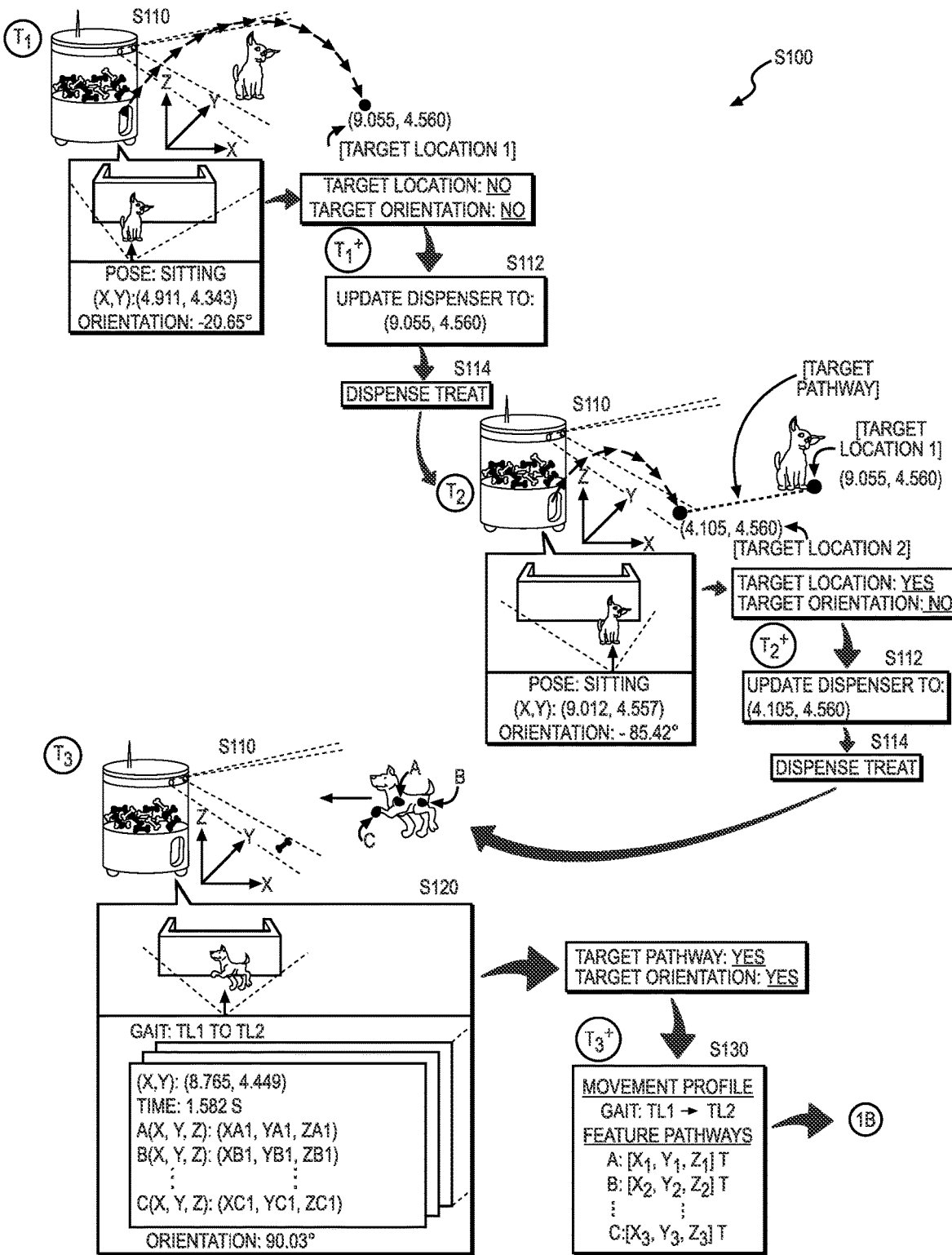
FIGS. 1A and 1B are flowchart representations of a method.
Figure 1B:
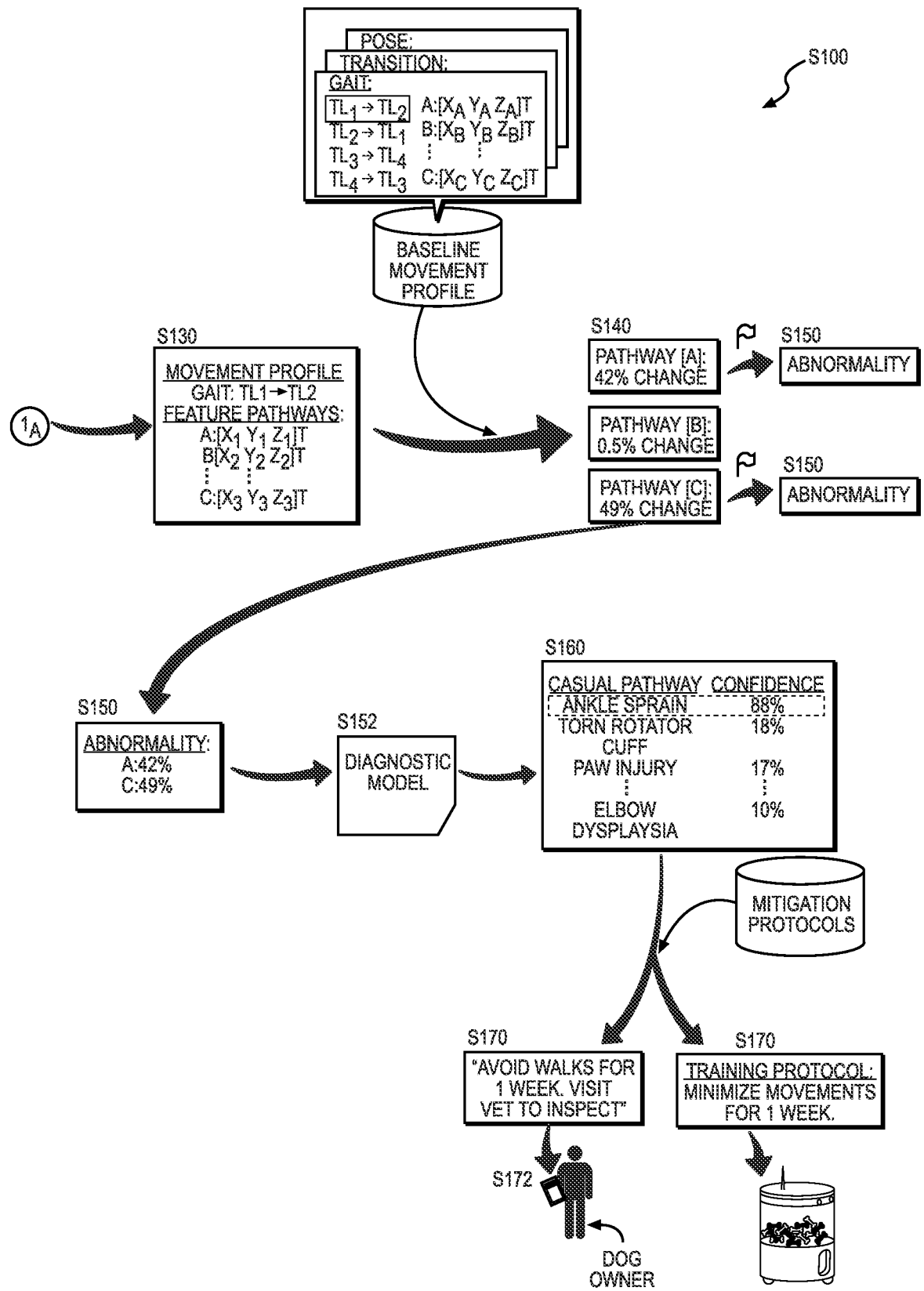
Figure 2A:
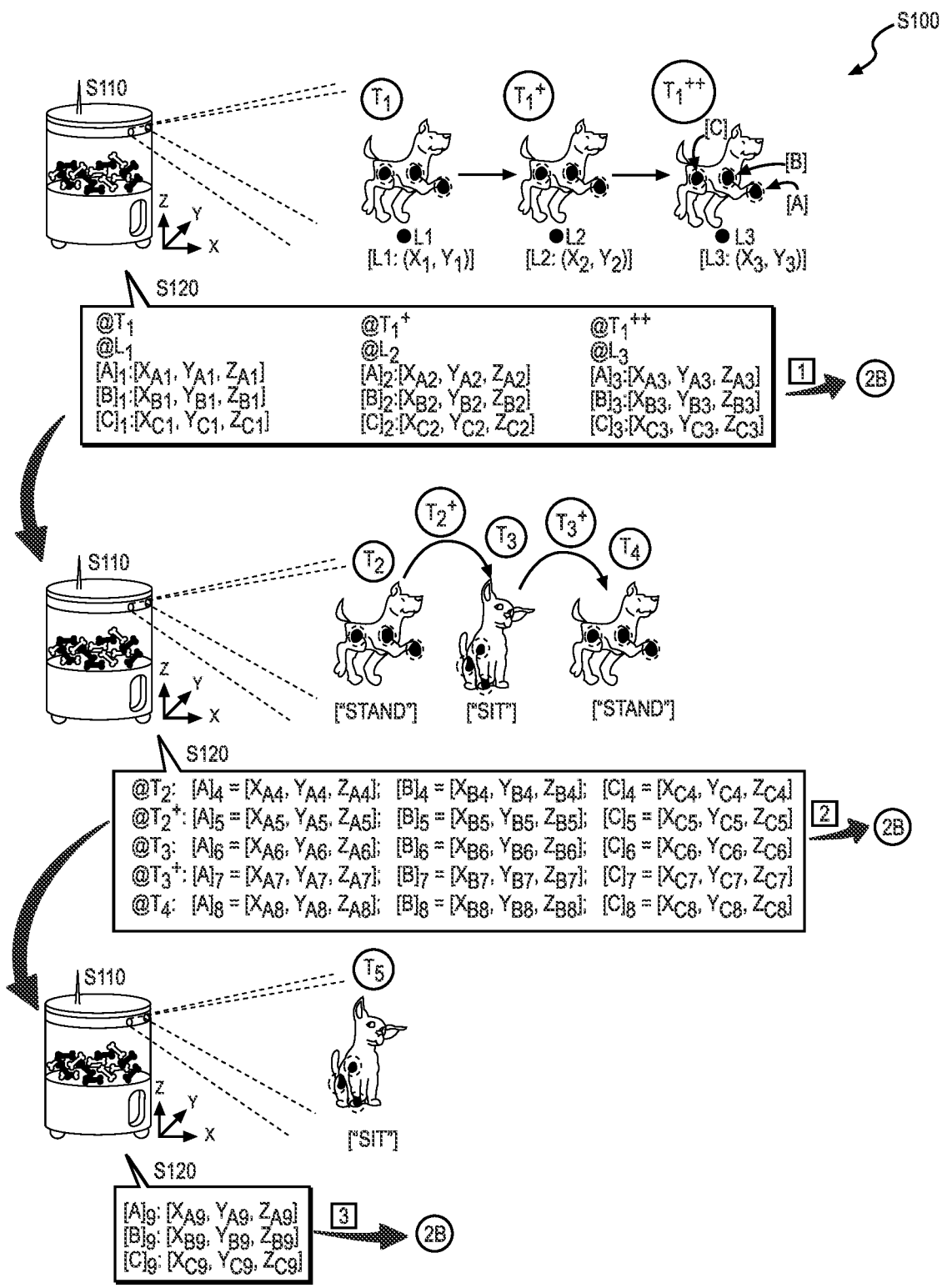
FIGS. 2A and 2B are flowchart representations of one variation of the method.
Figure 2B:
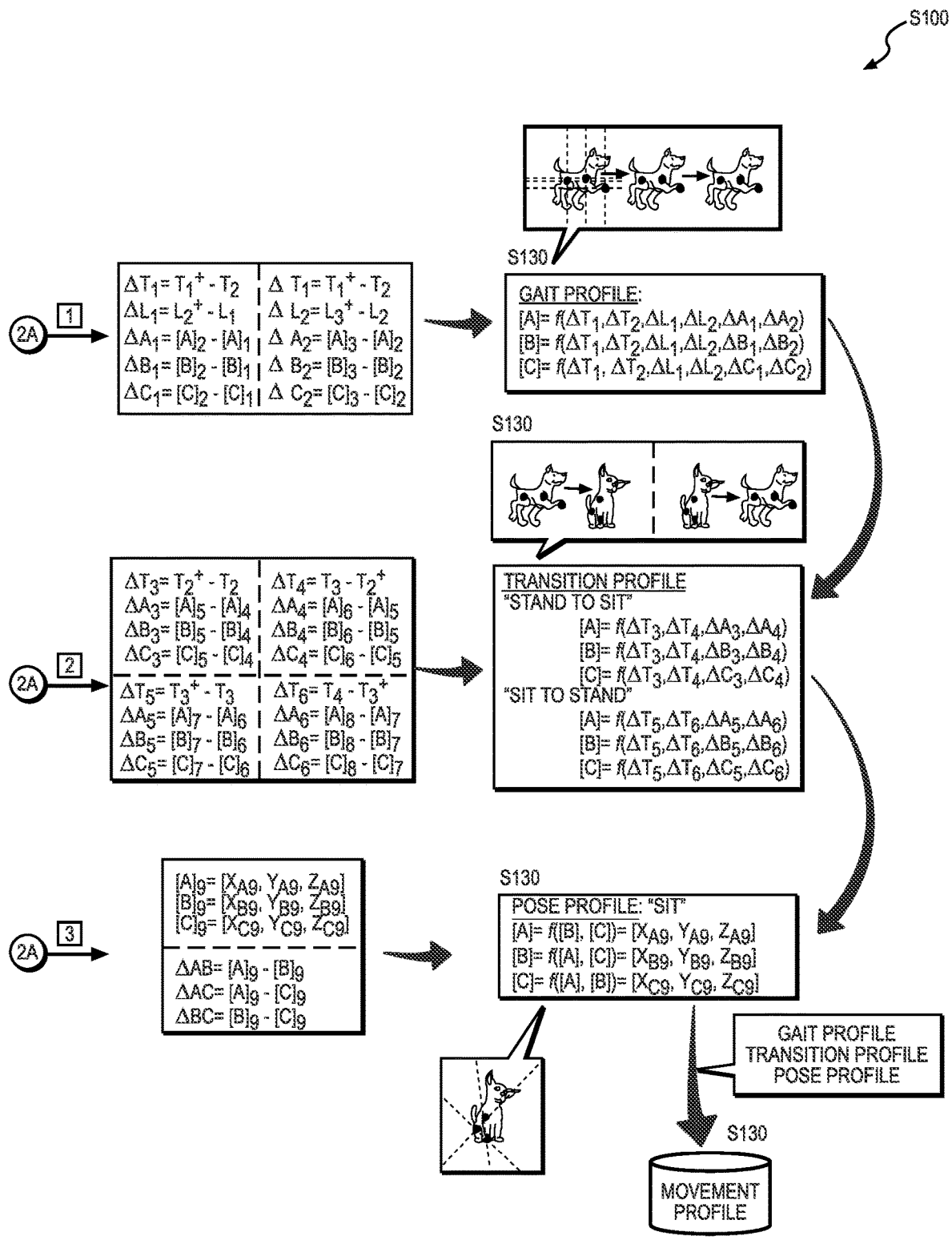
Figure 3A:
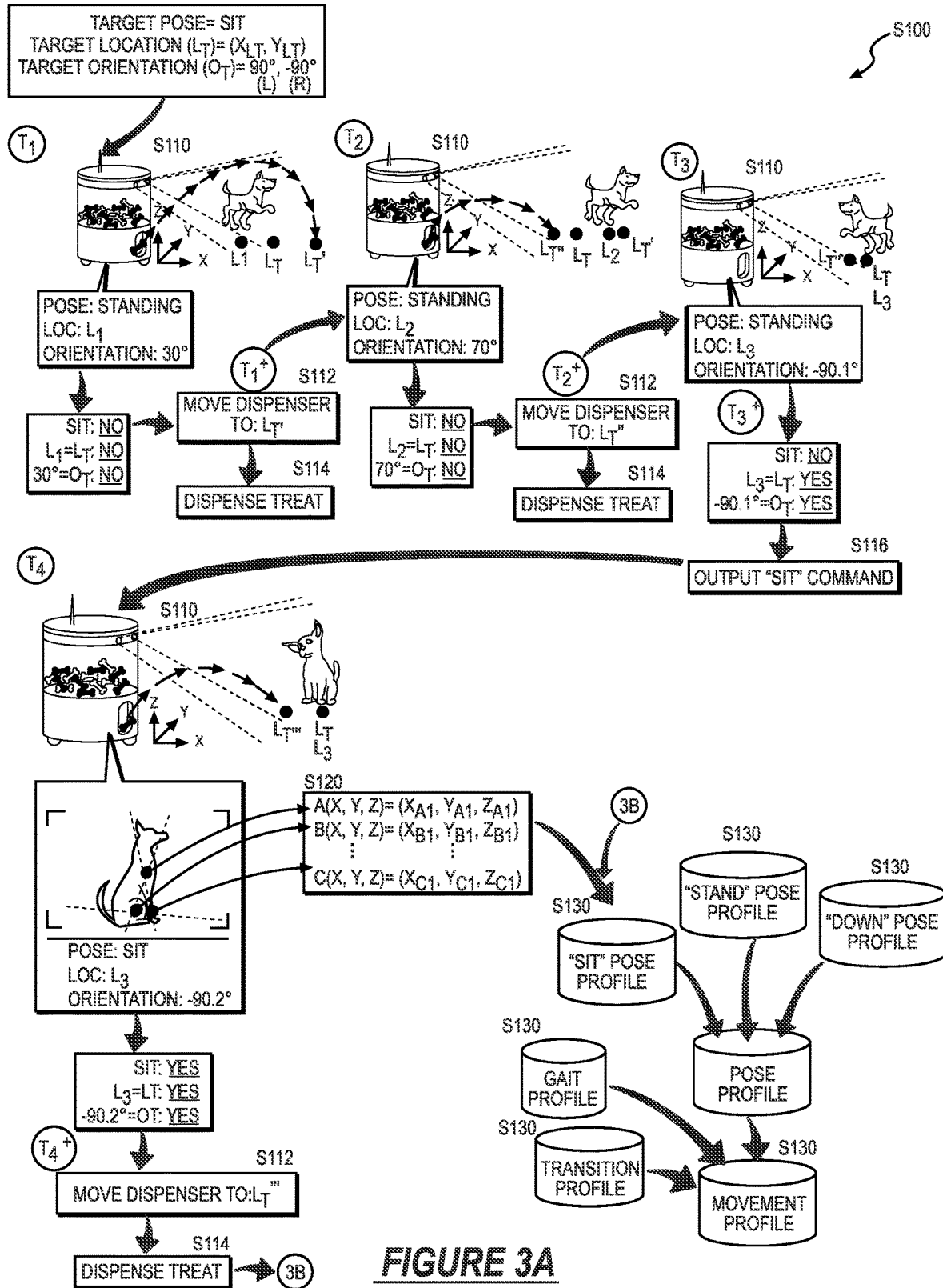
FIGS. 3A and 3B are flowchart representations of one variation of the method.
Figure 3B:
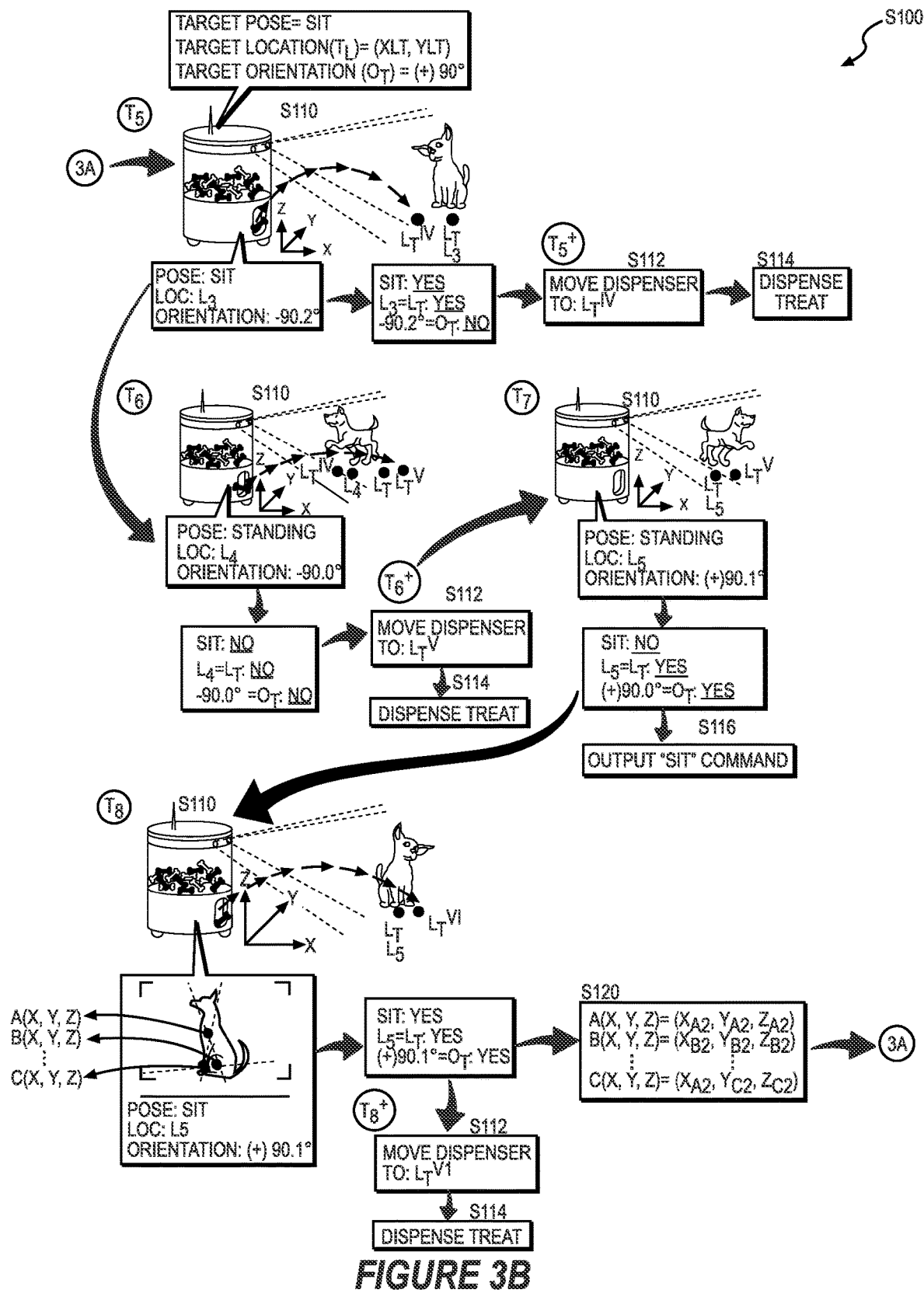
Figure 4:
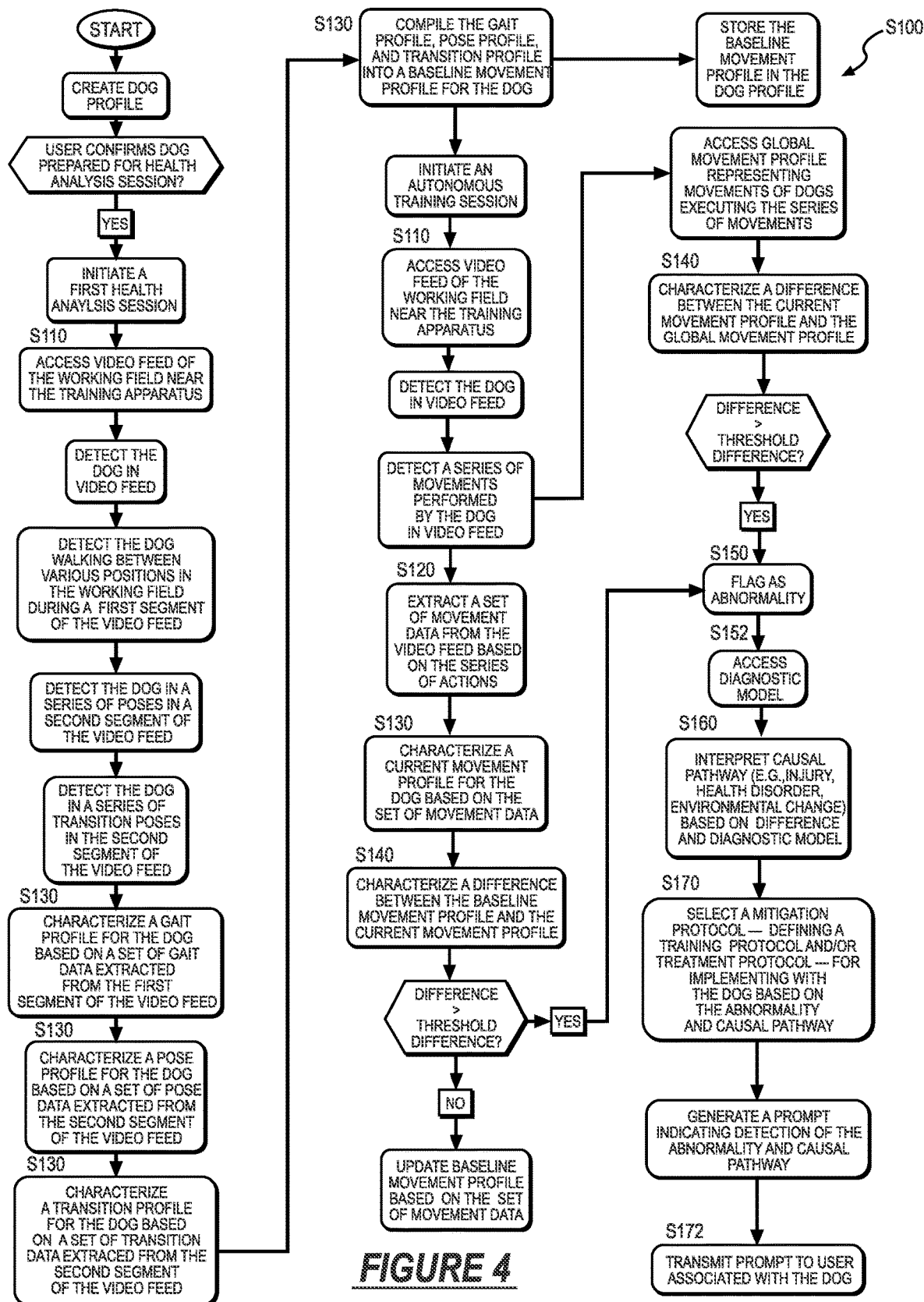
FIG. 4 is a flowchart representation of one variation of the method.
Figure 5A:
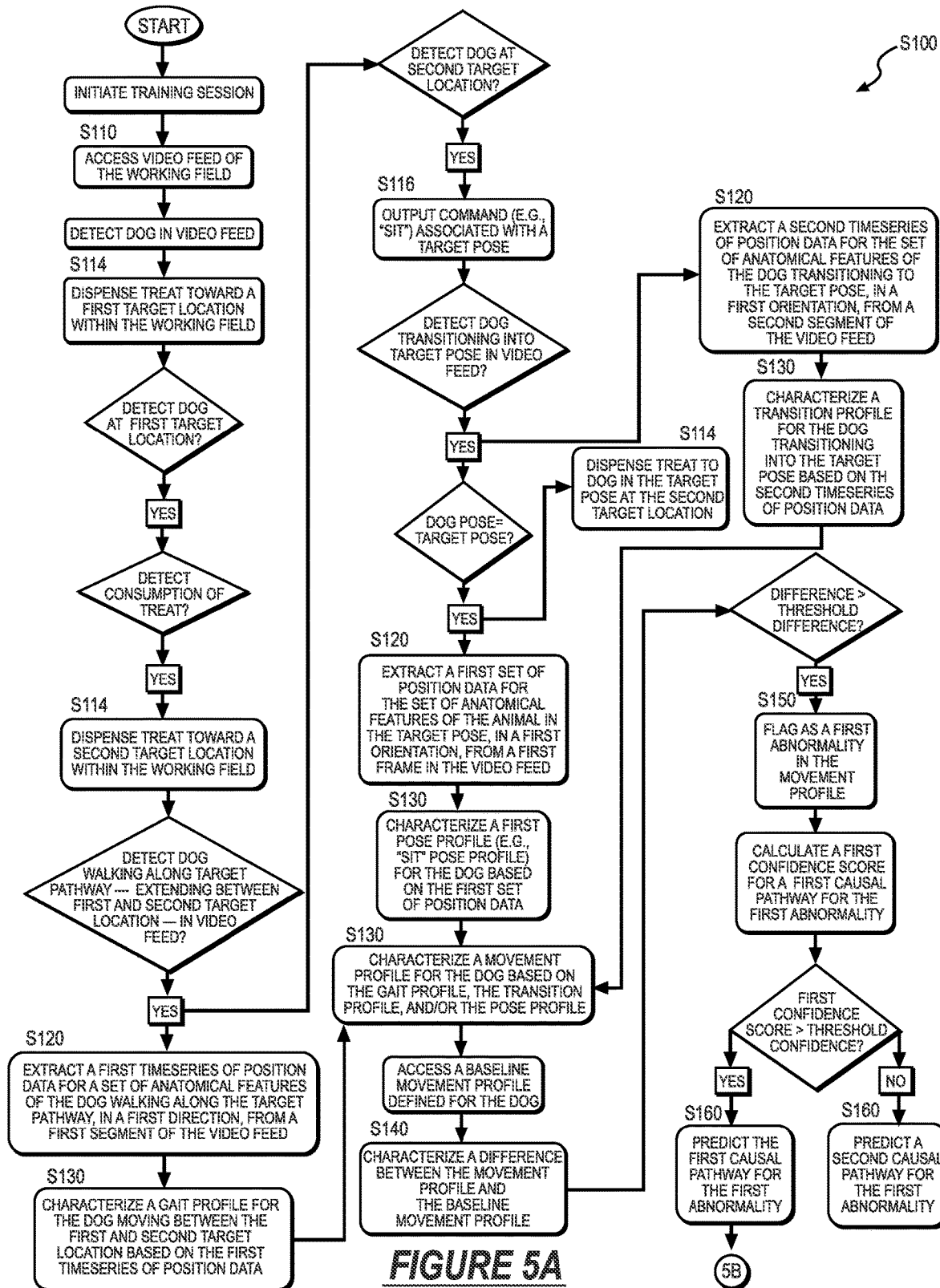
FIGS. 5A and 5B are flowchart representations of one variation of the method.
Figure 5B:
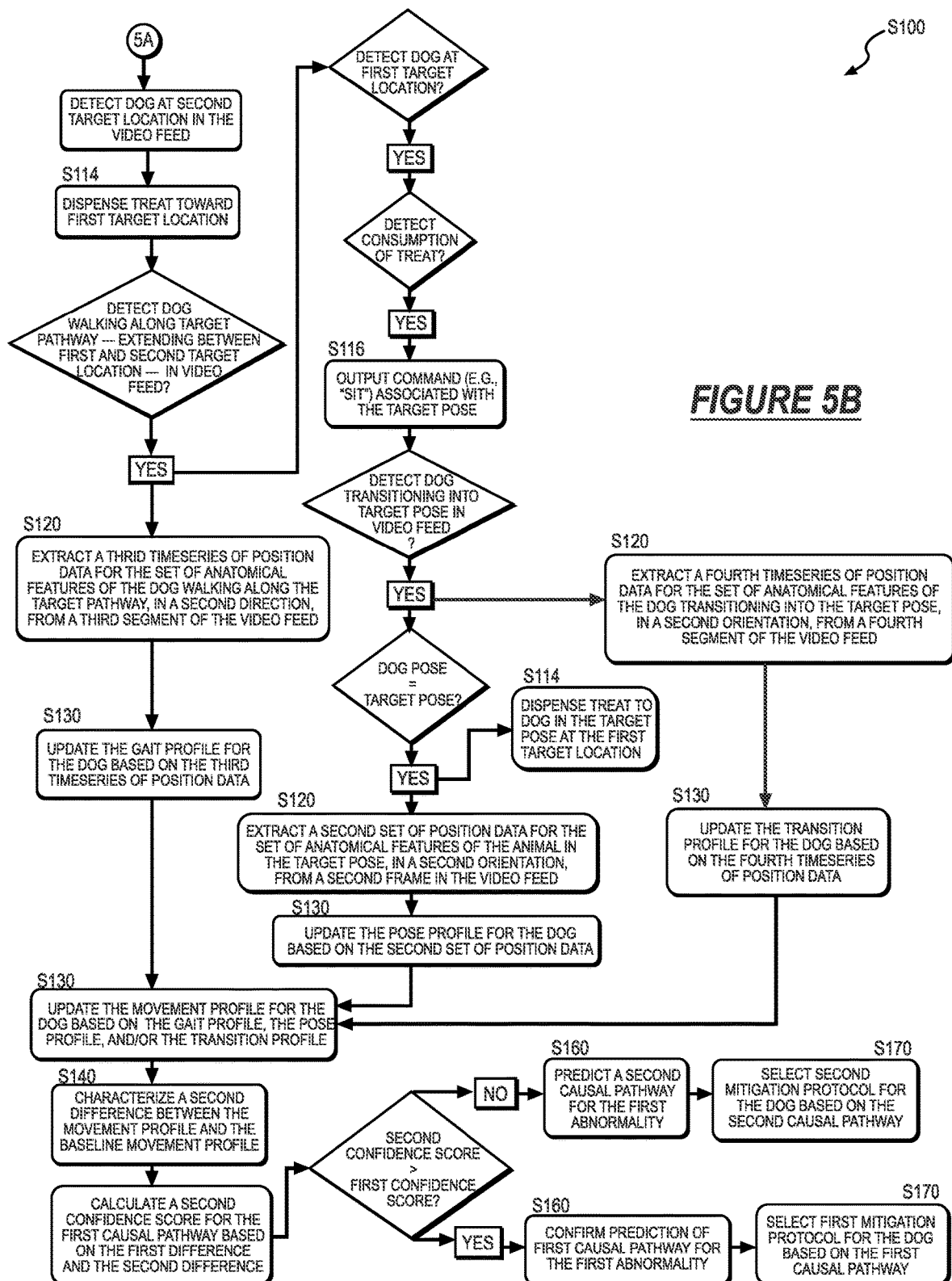
Figure 6:
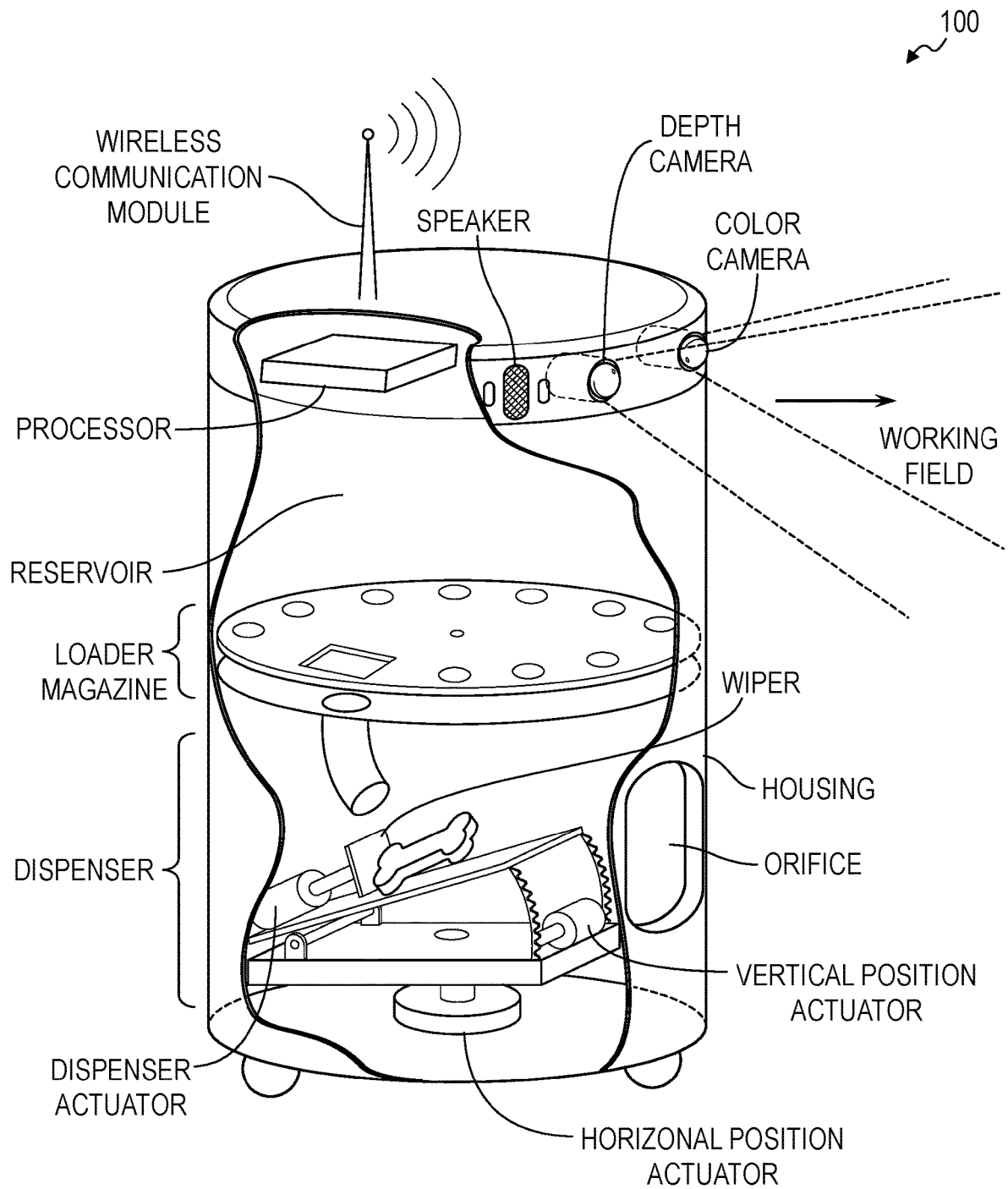
FIG. 6 is a schematic representation of a training apparatus.

As shown in FIGS. 1A, 1B, 2A, 2B, 3A, 3B, 4, 5A, 5B, and 6, a method S100 for monitoring health of an animal during autonomous training with a training apparatus includes, during a first training session for an animal: accessing a video feed recorded by an optical sensor defining a field of view intersecting a working field and integrated into a training apparatus 100 configured to dispense units of a primary reinforcer toward a range of locations within the working field via a dispenser integrated into the training apparatus 100 in Block S110; and, in the video feed, detecting the animal in the working field. The method S100 further includes: at a first time during the first training session, dispensing a first unit of the primary reinforcer toward a first target location within the working field in Block S114; at a second time succeeding the first time during the first training session, in response to detecting the animal at the first target location, dispensing a second unit of the primary reinforcer toward a second target location within the working field and intersecting a target pathway extending from the first target location to the second target location in Block S114; and, in response to detecting movement of the animal along the target pathway in the video feed during a first test period, collecting a first timeseries of position data representing changes in position of a set of anatomical features of the animal during the first test period in Block S120. The method S100 further includes: deriving a first movement profile for the animal based on the first timeseries of position data, the first movement profile representing movement of the animal along the target pathway during the first test period in Block S130; accessing a baseline movement profile stored for the animal; and characterizing a difference between the first movement profile and the baseline movement profile in Block S140. In response to the difference exceeding a threshold difference, the method S100 further includes: interpreting a first abnormality in the first movement profile for the animal in Block S150; and predicting a first causal pathway for the first abnormality based on the difference and characteristics of the first abnormality in Block S160; and selecting a first mitigation protocol for the animal based on the first abnormality and the first causal pathway in Block S170.

One variation of the method S100 includes, during a first training session: accessing a video feed recorded by an optical sensor defining a field of view intersecting a working field and integrated into the training apparatus configured to dispense units of a primary reinforcer toward a range of locations within the working field via a dispenser integrated into the training apparatus; detecting the animal in the working field in the video feed in Block S110; in response to detecting the animal at a first location within the working field, calculating a target location for dispensation of a first unit of a primary reinforcer based on the first location and a target pathway defining a target distance and a target orientation of the animal relative the training apparatus in Block S112; and dispensing the first unit of the primary reinforcer toward the target location in Block S114. In this variation, the method S100 further includes, during a first test period, in response to detecting movement of the animal along the target pathway, toward the target location, in the video feed: collecting a first timeseries of position data representing changes in position of a set of anatomical features of the animal during the first test period in Block S120; deriving a first movement profile for the animal based on the first timeseries of position data, the first movement profile representing movement of the animal along the target pathway during the first test period in Block S130; accessing a baseline movement profile defined for the animal in Block S140; and characterizing health of the animal based on a difference between the baseline movement profile and the first movement profile in Block S160.

One variation of the method S100 includes, during a first training session for an animal: accessing a video feed recorded by an optical sensor defining a field of view intersecting a working field and integrated into a training apparatus 100 configured to dispense units of a primary reinforcer toward a range of locations within the working field via a dispenser integrated into the training apparatus 100; in the video feed, detecting the animal in the working field in Block S110; and, at a first time during the first training session, in response to detecting the animal at a first location within the working field in the video feed, dispensing a first unit of the primary reinforcer toward a first target location within the working field in Block S114. In this variation, the method S100 further includes, in response to detecting relocation of the animal, in the video feed, from the first location toward the first target location during a first time period, succeeding the first time, within the first training session, interpreting a first timeseries of position data, representing changes in position of a set of features of the animal during the first time period, based on characteristics of a first segment of the video feed corresponding to the first time period in Block S120; and deriving a first movement profile for the animal based on the first timeseries of position data, the first movement profile representing motion of the animal during the first time period in Block S130. Then, during a second training session, succeeding the first training session, the method S100 further includes: accessing the video feed recorded by the optical sensor; in the video feed, detecting the animal in the working field in Block S110; and, at a second time during the second training session, in response to detecting the animal at a second location within the working field in the video feed, dispensing a second unit of the primary reinforcer toward a second target location within the working field in Block S114. In this variation, the method S100 further includes, in response to detecting relocation of the animal, in the video feed, from the second location toward the second target location during a second time period, succeeding the second time, within the second training session: interpreting a second timeseries of position data, representing changes in position of the set of features during the second time period, based on characteristics of a second segment of the video feed corresponding to the second time period in Block S120; deriving a second movement profile for the animal based on the first timeseries of position data, the first movement profile representing motion of the animal during the first time period in Block S130; characterizing a difference between the second movement profile and the first movement profile in Block S140; based on the difference, interpreting presence of an abnormality in the second movement profile in Block S150; and characterizing health of the animal based on presence of the abnormality in Block S160.

One variation of the method S100 includes, during a first training session for an animal: accessing a video feed recorded by an optical sensor defining a field of view intersecting a working field and integrated into a training apparatus 100 configured to dispense units of a primary reinforcer toward a range of locations within the working field via a dispenser integrated into the training apparatus 100 in Block S110; in the video feed, detecting the animal in the working field; at a first time during the first training session, outputting a first cue associated with a first target pose in Block S116; in response to outputting the first cue, detecting the animal in a first pose in the video feed; and, in response to the first pose falling within a threshold deviation of the first target pose, dispensing a first unit of the primary reinforcer to the animal via the dispenser in Block S114. In this variation, the method S100 further includes: extracting a first set of position data, representing positions of a set of anatomical features of the animal, from a first frame, in the video feed, depicting the animal in the first pose during the first training session in Block S120; deriving a first pose profile for the animal based on the first set of position data, the first pose profile representing posture of the animal in the first target pose during the first training session in Block S130; accessing a baseline pose profile derived from position data collected for the animal during an initial time period preceding the first training session; and characterizing a difference between the first pose profile and the baseline pose profile in Block S140. In response to the difference exceeding a threshold difference, the method S100 further includes: interpreting a first abnormality in the first pose profile in Block S150; predicting a first causal pathway for the first abnormality based on the difference in Block S160; and selecting a first mitigation protocol for the animal based on the first causal pathway in Block S170.

One variation of the method S100 includes, during a first training session for an animal: accessing a video feed recorded by an optical sensor defining a field of view intersecting a working field and integrated into a training apparatus 100 configured to dispense units of a primary reinforcer toward a range of locations within the working field via a dispenser integrated into the training apparatus 100 in Block S110; in the video feed, detecting the animal in the working field; and, at a first time during the first training session, dispensing a first unit of the primary reinforcer toward a first target location, within the working field, via the dispenser occupying a first position in Block S114. In this variation, the method S100 further includes, in response to detecting the animal at the first target location and in a first orientation relative the training apparatus 100: outputting a first cue associated with a first target pose in Block S116; detecting the animal in a first pose in the video feed; and, in response to the first pose falling within a threshold deviation of the first target pose, dispensing a second unit of the primary reinforcer to the animal via the dispenser in Block S114. The method S100 further includes: extracting a first set of position data, representing positions of a set of features of the animal, from a first frame in the video feed depicting the animal in the first pose, in the first orientation, at the first target location in Block S120; deriving a first pose profile for the animal based on the first set of position data, the first pose profile representing posture of the animal in the first target pose during the first training session in Block S130; accessing a baseline pose profile defined for the animal in the first target pose in Block S140; and characterizing health of the animal based on a difference between the first pose profile and the baseline pose profile in Block S160.

One variation of the method S100 includes, during a first time period: accessing a first image depicting the animal within a working field and in a first pose corresponding to execution of a target pose, the first image recorded at a first time by an optical sensor defining a field of view intersecting the working field and integrated into a training apparatus 100 configured to dispense units of a primary reinforcer into the working field in Block S110; extracting a first set of position data from the first image and representing positions of a set of anatomical features of the animal in the first pose at the first time in Block S120; and deriving a first pose profile for the animal in the target pose based on the first set of position data, the first pose profile representing posture of the animal in the target pose at the first time in Block S130. In this variation, the method S100 further includes, during a second time period succeeding the first time period: accessing a second image recorded by the optical sensor at a second time, succeeding the first time, and depicting the animal in a second pose corresponding to execution of the target pose by the animal in Block S110; extracting a second set of position data from the second image and representing position of the set of anatomical features of the animal in the second pose at the second time in Block S120; deriving a second pose profile for the animal in the target pose based on the second set of position data, the second pose profile representing posture of the animal in the target pose at the second time in Block S130; characterizing a first difference between the first pose profile and the second pose profile in Block S140; based on the difference, interpreting a first abnormality in the second pose profile in Block S150; predicting a first causal pathway for the first abnormality based on the difference and characteristics of the set of anatomical features in Block S160; and selecting a first mitigation protocol for the animal based on the first causal pathway in Block S170.

Figure 7:
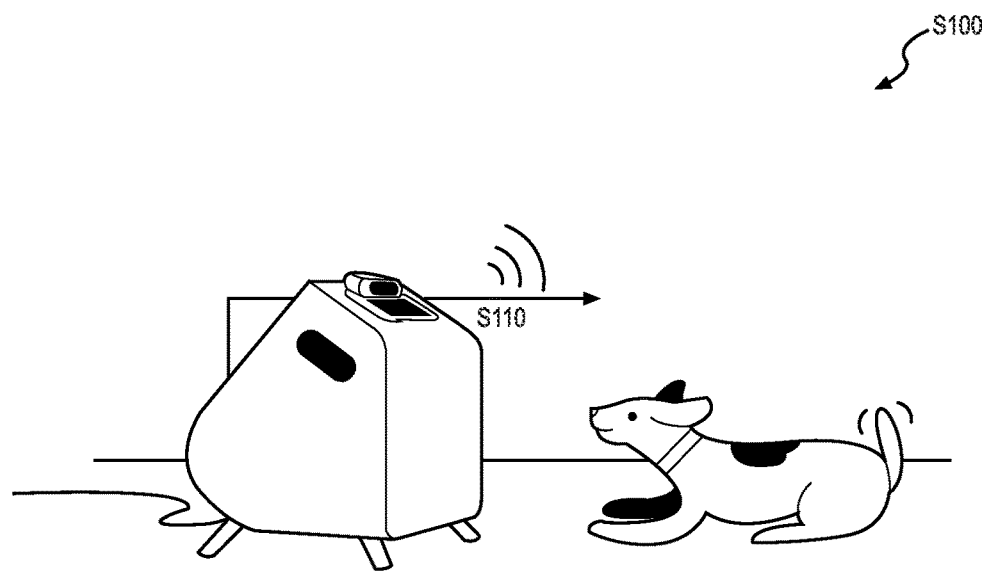
FIG. 7 is a schematic representation of one variation of the method.

As shown in FIGS. 1-5 and 7, a method S100 for monitoring health of a dog during autonomous training with a training apparatus 100 includes, during a first period of time: accessing a first video feed of a working field adjacent the training apparatus 100 via an optical sensor integrated into the training apparatus 100 in Block Silo; detecting the dog in the first video feed; initiating a health analysis protocol including a series of exercises configured to evaluate movements (e.g., postural movements, body alignment, gait) of the dog; extracting a first series of movement data for the dog based on behaviors of the dog exhibited during the series of exercises in the first video feed in Block S120; and characterizing a first movement profile for the animal based on the first series of movement data in Block S130.

The method S100 further includes: during a second period of time succeeding the first period of time: accessing a second video feed of the working field in Block Silo; detecting the dog in the second video feed; extracting a second series of movement data for the dog based on movements of the dog exhibited in the second video feed in Block S120; characterizing a second movement profile for the animal based on the second series of movement data in Block S130; and characterizing a first difference between the second movement profile and the first movement profile in Block S140. The method S100 further includes, in response to the first difference exceeding a first threshold difference: flagging the first difference as a first form abnormality (e.g., exercise form abnormality) for the dog in Block S150; accessing a diagnostic model linking form abnormalities to a set of diagnoses for dogs in Block S152; and interpreting a first diagnosis (or "causal pathway") for the dog based on the first form abnormality and the diagnostic model in Block S160.

In one variation, the method S100 further includes accessing a global movement profile representing movements of dogs executing the series of exercises and characterizing a second difference between the first movement profile and the global movement profile in Block S140. In this variation, the method S100 further includes, in response to the second difference exceeding a second threshold difference: flagging the second difference as a second form abnormality in Block S150; and interpreting a second diagnosis for the dog based on the second difference and the diagnostic model in Block S160.

In one variation, the method S100 further includes: generating a notification indicating presence of the first form abnormality and suggesting the first diagnosis for the dog; and transmitting the notification to a user associated with the dog in Block S172.

2. Applications

Generally, Blocks of the method S100 can be executed by a computer system (e.g., a local server, a remote computer system) and/or by a local training apparatus 100 to automatically and responsively assess and monitor an animal's health (e.g., orthopedic and/or neurological) based on the animal's gait and postural movements in preparation for and during autonomous training of the animal with the training apparatus 100. In particular, the computer system and/or training apparatus 100 (hereinafter the "system") can: detect physical abnormalities (e.g., postural, alignment, velocity of movement) related to an animal's gait, static postures (e.g., poses), and/or dynamic postures (e.g., transitions between poses); interpret orthopedic and/or neurological health diagnoses based on these abnormalities; selectively suggest treatments and/or implement methods to mitigate or accommodate these abnormalities over time to improve animal health; and interpret changes in the animal's gait, static postures, and/or dynamic postures over time to monitor the animal's health.

In one example, the system can prompt a user (e.g., via text message, via notification on a native application executing on the user's mobile device) associated with the animal to locate the animal and the training apparatus 100 in a common space in preparation for an initial health analysis session, such as prior to a training session with the animal. During this initial health analysis session, the system can record a series of movements performed by the animal—such as walking in a straight line in various directions and/or walking in a circle, holding different poses (e.g., "sit," "stand," "down"), and/or transitioning between different poses—and extract a series of movement data (e.g., position and/or velocity data) representative of the series of movements performed by the animal. For example, the system can extract: a series of positions of the dog relative to the working field; a series of positions of various components of the dog's body (e.g., head, feet, knees, hips) relative to one another; a series of velocities of the dog's body (e.g., as the dog walks between positions within the working field); a series of velocities of a particular component of the dog's body; etc. The system can then access a (global) diagnostic model linking movement data to movement- and postural-related abnormalities (hereinafter "form abnormalities") and/or corresponding diagnoses. The system can therefore leverage the dog's movement data recorded during the initial health analysis session to interpret whether the dog exhibits a particular form abnormality (e.g., gait, static posture, and/or dynamic posture abnormalities) and thus interpret a particular diagnosis (e.g., an orthopedic and/or neurological diagnosis) for the dog associated with this particular form abnormality.

Further, the system can execute this process during an initial health analysis session—such as before initiating training with the dog—in order to capture baseline gait, pose (e.g., posture), and/or transition pose (e.g., posture and velocity) data (or "movement data") for this dog to derive a baseline movement profile for the dog from these baseline data. The system can subsequently execute the method to capture additional movement data to derive additional movement profiles for the dog over time. The system can then compare current movement data (e.g., represented in a current movement profile) to baseline movement data (represented in the baseline movement profile) to: detect changes (i.e., form abnormalities) to the dog's gait, poses, and/or transition poses over time, such as during autonomous training sessions with the dog at the training apparatus 100; discern between acute and long-term changes exhibited by the dog; predict a trajectory of a particular change—such as corresponding to an orthopedic injury or neurological disorder—for the dog over time; identify triggers of these changes; and/or track or suggest methods or treatments to mitigate these changes, which may be indicative of changes to the dog's health.

The system and/or training apparatus 100 are described above as executing the method S100 to train an individual dog—such as at the user's home—and to return training- and/or health-related prompts to the dog's owner based on the dog's performance during health analysis sessions and/or training sessions at the training apparatus 100. However, the system and/or training apparatus 100 can similarly execute the method S100 to train multiple dogs (e.g., separately and/or together) present in the user's home over time and to return training- and/or health-related prompts for these dogs to the user based on performance of these dogs during their corresponding health analysis sessions and/or training sessions. Additionally or alternatively, the training apparatus 100 can be installed or located at a boarding facility, a training facility, an animal shelter, or other facility, and can return training- and/or health-related prompts to facility staff and/or these dogs' owners based on performance of these dogs during their corresponding training sessions at the training apparatus 100.

The system and/or training apparatus 100 are described below as executing Blocks of the method S100 to autonomously train a dog and to monitor a dog's health based on the dog's exercise form (e.g., gait, postures, alignment) during health analysis and/or training sessions. However, the system and/or training apparatus 100 can execute these Blocks of the method independently or in conjunction with a local computing device (e.g., a smartphone executing a user portal or a training application) or a remote computer system (e.g., a computer network, a remote server) in order to train any other type of animal, such as a cat, a bird, or a horse.

3. Training Apparatus

Figures 8A, 8B, 8C:
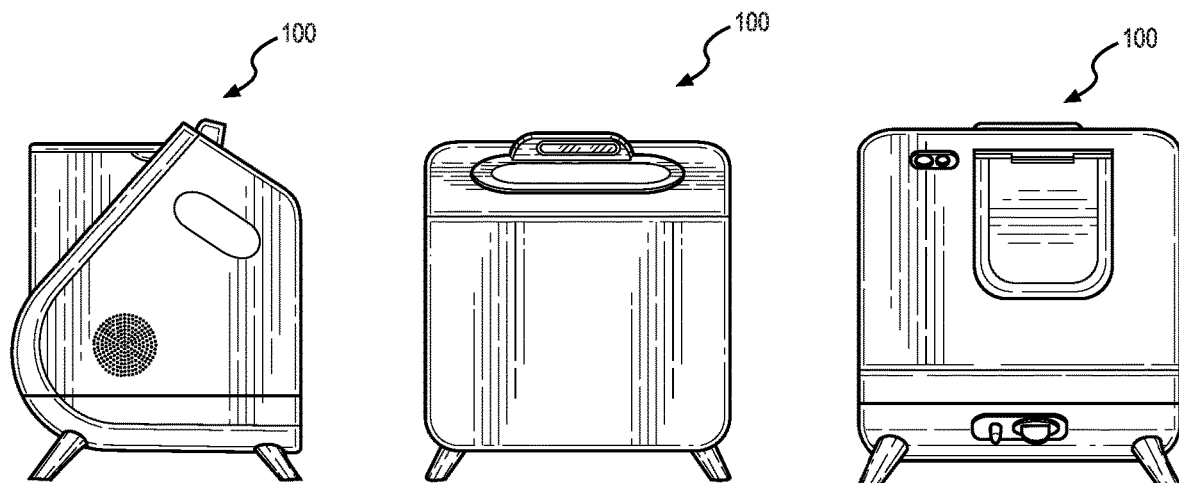
FIGS. 8A, 8B, and 8C are schematic representations of the training apparatus.

As shown in FIGS. 6, 7, and 8A-8C, the training apparatus 100 can include: a suite of optical sensors configured to record images (e.g., color and/or depth images) of a working field ahead of the training apparatus 100; audio sensors (e.g., a microphone) configured to record ambient noise and dog vocalizations within the working field around the system; a speaker configured to output audible cues; a wireless communication module configured to download data and/or a dog model from a remote database or local computing device; a treat reservoir configured to store units of a treat, such as loose treats or treats in a magazine; a dispenser configured to eject treats into the working field, such as to a target lateral and depth position in the working field to land at an animal's feet or along a target trajectory to land at or near the animal's mouth; a loader configured to load individual treat units from the reservoir into the dispenser; a processor configured to interpret positions and poses of a dog in the working field in (near) real-time from images recorded by the suite of optical sensors, to move the dispenser into axial alignment with the dog as the dog moves through the working field, and to selectively trigger the dispenser to eject a treat unit toward or near the dog; and a housing containing these elements.

In one implementation, the training apparatus 100 includes: a color camera configured to output 2D color images (hereinafter "color images"); and a depth camera configured to output 3D depth maps or point clouds (hereinafter "depth images"). In this implementation, the color and depth camera can be arranged in fixed positions on the housing and can define fields of view directed outwardly from the housing to define the working field in which the training apparatus 100 identifies, tracks, and selectively rewards an animal.

The wireless communication module can include a wireless transceiver configured to connect to an external device and to retrieve various data from this device. For example, the training apparatus 100 can connect to a user's smartphone or tablet—executing a native dog training application—to access: animal characteristics or descriptors input by the user; oral commands spoken by the user and recorded by the user's device; and/or training protocol preferences or selections entered by the user at the device. The wireless communication module can also download a generic animal model from a remote database. Alternatively, the wireless communication module can download a particular animal model—from a set of available animal models—more tailored to detecting and identifying a particular animal designated for training by the training apparatus 100, such as based on a species, breed, age, size, or markings of the animal input by the user into the native dog application executing on her smartphone or tablet. Furthermore, the wireless communication module can upload color and/or depth images recorded by the training apparatus 100 to a remote server in order to expand a training set of images of animals available to the remote server; the remote server can then retrain an animal model based on these additional data and redeploy the animal model to the training apparatus 100 (and to other instances of the training apparatus 100) to improve detection of an animal and identification of poses of the animal.

In one variation, the training apparatus 100 can include multiple reservoirs configured to store units of different types of edible food for the dog. For example, the training apparatus 100 can include: a first reservoir configured to store units of a treat for the dog; and a second reservoir configured to store units of a health supplement or medication, such as a pain medication, a joint medication, and/or a nutritional supplement. In this variation, the system can selectively dispense units of food from each reservoir, such as according to a particular schedule (e.g., derived for the dog, specified by the owner) and/or responsive to a detected change in dog health and/or detection of abnormalities in the dog's exercise form.

4. Initialization and Dog Profile

The system can interface with a native application or web application—executing on a user's computing device—to initiate an acclimation session for a dog and to later configure a series of training protocols for the dog. For example, once the system is received by the user, the user can download the native application to her smartphone and connect her smartphone to the system, such as by: wirelessly pairing her smartphone to the system; scanning a QR code arranged on the system to register the system to her smartphone; or by manually entering into the native application a unique code arranged on the system or product packaging.

Once the system is registered and connected to the user's smartphone, the user can create a new profile for her dog within the native application and manually populate the new profile with various information, such as: a name; age; breed; size; and/or primary colors of the dog's coat (e.g., black for a black Labrador or reddish-brown for a redbone coonhound). This new profile can be stored in a remote database, and the native application can upload these data to the new profile via the Internet. Alternatively, the system can extract or derive these dog characteristics directly from a video feed recorded during a first acclimation session with the dog and then populate the profile for the dog with these characteristics accordingly.

In one variation, upon purchase of a new training apparatus 100 by a user and before delivery of the training apparatus 100 to the user, the computer system can automatically generate a new dog profile for a user's dog. For example, upon purchase of a new training apparatus 100, the computer system can: prompt the user—via a web portal accessed by the user at the user's mobile phone—to provide an email address for setting up a new profile; and automatically generate a new profile for the user and her dog linked to this email address. In this example, the computer system can automatically link this new dog profile to the training apparatus 100 shipped to the user. Once the training apparatus 100 is delivered to the user, the user may download the native application to her smartphone and log in to the new dog profile (e.g., via her email address linked to the new profile) created for her dog. Upon logging into the new dog profile, the training apparatus 100 can: automatically wirelessly pair her smartphone to the training apparatus 100. The computer system can then: prompt the user to specify a set of characteristics (e.g., breed, age, sex, weight, activity level, name) of the user's dog; and populate the new dog profile for the user and her dog based on the set of characteristics input by the user.

Once a dog profile is created, the computer system can access the dog profile before an acclimation session, a health analysis session and/or training session. The computer system can identify a first dog in a field of the training apparatus 100 and access a first dog profile associated with the first dog. For example, the computer system can prompt a user to scan an RFID tag located on a collar of the first dog. In response to the RFID tag corresponding to the first dog, the computer system can access the first dog profile. In another example, the computer system can prompt the user to input a unique identifier (e.g., within the native application) corresponding to the first dog. Upon recognizing the unique identifier, the computer system can access the first dog profile. Alternatively, the computer system can receive images of the first dog recorded by the training apparatus 100 and extract characteristics of the first dog from these images. Based on these extracted characteristics, the computer system can identify the first dog and access the first dog profile.

In one variation, upon generation of a dog profile for a dog, the training apparatus 100 can initiate an acclimation session to verify that the user's dog is comfortable with the training apparatus 100 and prepared for autonomous training with the training apparatus 100. For example, the training apparatus 100 can: initiate a first acclimation session; record a video feed through the camera (and an audio feed via the microphone); track and monitor the dog in this video feed; dispense treats (e.g., an "unconditioned reinforcer") in quick succession into the working field for the dog; and characterize the dog's response to these treats during a first period of this acclimation session based on the video and audio feeds. If the dog exhibits shyness, flinches, retreats from the system, vocalizes, or otherwise exhibits discomfort during this first period, the training apparatus 100 can repeat this first period but under different parameters that may yield less discomfort for the dog, such as: dispensing treats further away from the dog and/or at lower velocity to reduce perception of these treats as invasive; dispensing treats more slowly and/or at lower velocity in order to reduce machine noise generated by the system; or dispensing treats with the user closer to the dog.

In one implementation, the system can execute multiple discrete acclimation sessions with the dog to confirm the dog's readiness for autonomous training with the system.

4.1 Animal Model

In one variation, prior to a first training protocol with the dog (e.g., a first "introduction protocol"), the training apparatus 100 can: query a remote database for a dog presence, movement, transition, and/or pose detection model trained on images of dogs of an age, breed, size, shape, and/or coat length, etc. that are the same or similar to characteristics stored in the dog's profile; and then download this animal model from the remote database, such as over the internet or via the user's smartphone or tablet. Similarly, the native application, the training apparatus 100, and/or the remote computer system can: tune a generic animal model based on various characteristics stored in the dog profile; or select one animal model—from a corpus of existing animal models—developed to detect presence and pose of dogs exhibiting various characteristics similar to those of the dog. The training apparatus 100 can then implement a local copy of this animal model to rapidly detect presence (i.e., location and orientation) and pose of the dog in images recorded by the training apparatus 100 during a subsequent training protocol with the dog. By accessing an animal model "tuned" to detecting presence and pose of animals exhibiting characteristics similar to those aggregated into the dog's profile during setup, the training apparatus 100 may detect the presence and orientation of the dog in the working field more quickly and with increased confidence.

Alternatively, the training apparatus 100 can implement a generic animal model to detect the presence and orientation of the dog in the working field, such as if limited information about the dog is provided by the user during setup.

4.2 Tracking Dog Position and Dispenser Position Update

During execution of a training protocol, the training apparatus 100 can regularly: record color and/or depth images of the working field; implement the animal model to detect a position and pose of the dog; and regularly update the position of the horizontal position actuator (and the vertical position actuator) to align the dispenser to the dog (e.g., to the center of the dog's front feet or to the dog's mouth) in real-time, such as at a rate of 30 Hz, as described in U.S. patent application Ser. No. 16/418,596, filed on 21 May 2019, which is incorporated in its entirety by this reference. In particular, by regularly recording and scanning images of the working field for the dog, the training apparatus 100 can rapidly determine whether the dog has entered a target position specified in the current training protocol and thus minimize a time to detect that the dog has responded to a command. Furthermore, by tracking the dog in the working field and updating positions of various actuators in the training apparatus 100 in real-time to align the output of the dispenser to the dog, the training apparatus 100 can immediately eject a primary reinforcer unit to a target location and/or directly at the dog's feet and thus minimize a time from detecting that the dog has responded to a command to consumption of a reinforcement by the dog.

5. Health Analysis Session

Once the system has accessed the foregoing data, the system (or the native dog training application, etc.) can prompt the user to locate the dog and the training apparatus 100 in a common space in preparation for a first health analysis session. Once the user confirms that she and the dog are ready for the first health analysis session, the training apparatus 100 can: initialize the health analysis session;

begin recording a video feed of the working field near the system; and detect the dog and track its motion and postures in the video feed.

For example, prior to the first health analysis session, the system can load a health analysis training protocol onto the training apparatus 100 for execution with the dog during the health analysis session. In this example, the health analysis training protocol can be configured to enable evaluation of: the dog's posture (e.g., body alignment) during a set of (static) poses (e.g., "sit" pose, "stand" pose, "lay down" pose); the dog's posture and/or velocity during a set of (dynamic) transition poses (e.g., "stand to sit" transition pose, "sit to down" transition pose, "down to stand" transition pose); and the dog's gait (e.g., posture, velocity, stride length and/or duration during walking).

In one implementation, the system can: upload the health analysis protocol onto the training apparatus 100 in preparation for a health analysis session with the dog; and trigger initiation of the health analysis session at the training apparatus 100. The training apparatus 100 can then execute the health analysis session according to the health analysis protocol to capture a video feed of the dog, in the working field adjacent the training apparatus 100, executing a series of movements (e.g., poses, transitions, walking).

For example, the system and/or training apparatus 100 can execute the health analysis protocol to initially evaluate the dog's gait, such as by capturing video of the dog: walking along a first pathway, directly outward from the training apparatus 100, in a first direction, from a first location to a second location; walking along the first pathway, directly toward the training apparatus 100, in a second direction opposite the first direction, from the second location to the first location; walking along a second pathway orthogonal the first pathway, in a third direction, from a third location to a fourth location; and walking along the second pathway in a fourth direction opposite the third direction, from the third location to the fourth location. Then, the system and/or training apparatus 100 can evaluate the dog's static and dynamic postures—according to the health analysis protocol—during a series of static and transition poses, such as by capturing video or images of the dog, facing the training apparatus 100: standing in a fifth location defining a center between the first, second, third, and fourth locations; transitioning between standing and sitting in the fifth location; sitting in the fifth location; transitioning between sitting and lying down in the fifth location; and lying down in the fifth location. The system can then repeat this series of poses and transitions between poses with the dog: facing away (e.g., 180 degrees) from the training apparatus 100; orienting its right side toward the training apparatus 100 (e.g., facing 90 degrees away from the training apparatus 100); and orienting it's left side toward the training apparatus 100 (e.g., facing 270 degrees away from the training apparatus 100).

In one implementation, the system can train the dog to complete a health analysis session according to a particular health analysis protocol. For example, the system can incorporate training of the health analysis protocol into an autonomous training session with the dog. Additionally and/or alternatively, in another example, the training apparatus 100 can dispense treats throughout the health analysis session to encourage the dog to move to a particular position within the working field and/or to promote particular behaviors. Additionally and/or alternatively, in yet another example, the system can prompt the user to assist in completing the health analysis session, by encouraging her dog to complete a series of exercises according to the health analysis protocol.

5.1 Health Analysis: Movement Data

During the health analysis session, the system can record a series of movement data—such as the dog's position within the working field, positions of various components of the dog's body (e.g., head, feet, knees, hips, ankles), a velocity of the dog's body, a velocity of a particular component of the dog's body, a distance between components of the dog's body—corresponding to the dog's gait, static postures, and/or transition postures or movements between poses during the health analysis session. The system can then leverage this movement data to identify abnormalities in the dog's exercise form (or "form abnormalities")—based on the dog's movements and postures—which may correspond to various orthopedic and/or neurological health issues. Additionally and/or alternatively, the system can leverage this movement data to initialize a baseline movement profile for the dog, the baseline movement profile representative of the dog's form (e.g., body alignment, posture, velocity) during various exercises, such as representative of the dog's gait and/or various postural movements (e.g., poses, transitions between poses).

5.1.1 Motion Analysis: Video Feed

In one implementation, the system can leverage video feed of the dog—recorded at the training apparatus 100 (e.g., by an optical sensor)—moving to various locations within the working field to derive timeseries gait data for the dog based on movement of a set of features (e.g., anatomical features)—such as joints, muscles, appendages, etc.—of the dog while moving (e.g., walking) about the working field. In particular, in this implementation, the system can train the dog to execute a series of movements configured to evaluate various motion characteristics—such as change in position of the set of features (e.g., joints, appendages, regions of the body) of the dog during movement, change in distance between the set of features during movement, velocity of the dog and/or the set of features during movement—exhibited by the dog during execution of the series of movements.

5.1.1.1 Gait Analysis

In one implementation, the system can train the dog to move between various locations within the working field in order to evaluate movement of the dog and/or movement of a set of anatomical features of the dog—such as the dog's limbs or joints—during locomotion (e.g., walking, running) between these locations.

In particular, in this implementation, the system can: dispense a first unit of primary reinforcer (or "treat") toward a first target location within the working field to encourage the dog to move toward the first target location; and, once the dog is detected at the first target location (e.g., within a threshold deviation or distance of the first target location), dispense a second unit of the primary reinforcer toward a second target location within the working field to encourage the dog to move from the first target location toward the second target location. The system can then dispense the second unit of the primary reinforcer toward the second target location that intersects a target pathway—extending from the first target location to the second target location—such that the dog is encouraged to traverse the target pathway to retrieve the second unit of the primary reinforcer. Then, during movement of the dog between the first target location and the second target location along the target pathway, the system can collect a timeseries of movement data (e.g., gait data) representing changes in position of a set of features (e.g., anatomical features) of the dog during movement along the target pathway.

For example, during a first health analysis session for an dog—during and/or distinct from a training session for the dog—the system can: dispense a first unit of the primary reinforcer toward a first target location (e.g., a calculated and/or predefined location) within the working field; and, in response to detecting the dog at the first target location—such as for a threshold duration (e.g., one second, five seconds, fifteen seconds and/or in response to confirming consumption of the first unit of the primary reinforcer (e.g., in the video feed)—dispense a second unit of the primary reinforcer toward a second target location within the working field. In particular, the system can dispense the second unit of the primary reinforcer to a second target location intersecting a first target pathway—extending from the first target location to the second target location—defining a target distance (e.g., less than a width of the working field) between the first target location and the second target location and/or defining a first target orientation for the dog, relative the training apparatus 100, during movement along the first target pathway. For example, the system can define the first target pathway such that a first side (e.g., a front side, a back side, a right side, a left side) of the dog is oriented toward or facing the optical sensor integrated within the training apparatus 100.

Then, in response to detecting movement of the dog along the target pathway—in a first direction from the first target location to the second target location—the system can collect a first timeseries of position data representing changes in position of a set of anatomical features (e.g., appendages, joints, muscles, body features) of the dog traversing the target pathway in the first direction. In particular, the system can: collect a first set of feature positions for the set of anatomical features—each feature position, in the set of feature positions, corresponding to a particular anatomical feature in the set of anatomical features—for the dog at a first time and at a first location arranged between the first target location and the second target location on the target pathway; record a first time value corresponding to the first time; collect a second set of feature positions for the set of anatomical features of the dog at a second time and at a second location—arranged between the first location and the second target location—along the target pathway; and record a second time value corresponding to the second time. The system can thus derive the first timeseries of position data by: linking the first set of feature positions to the first time value and the first location along the target pathway; and linking the second set of feature positions to the second time value and the second location along the target pathway.

In particular, in one example, the system can: extract a first position of a first anatomical feature (e.g., a shoulder joint), in the set of anatomical features, from a first frame—recorded at a first time and depicting the dog at a first location along the first target pathway—in the video feed; and extract a second position of a second anatomical feature (e.g., an elbow joint), in the set of anatomical features, from the first frame. The system can then: repeat this process to extract a position for a particular subset of anatomical features, in the set of anatomical features, and/or for each anatomical feature, in the set of anatomical features, from the first frame in the video feed; and record a first time value corresponding to the first time. Then, the system can: extract a third position of the first anatomical feature from a second frame—recorded at a second time (e.g., succeeding the first time) and depicting the dog at a second location (e.g., arranged between the first location and the second target location) along first the target pathway—in the video feed; and extract a fourth position of the second anatomical feature from the second frame. The system can similarly: repeat this process to extract a position for the particular subset of anatomical features and/or for each anatomical feature, in the set of anatomical features, from the second frame; and record a second time value corresponding to the second time.

Finally, in the preceding example, the system can: link the first time value to the first position of the first anatomical feature (e.g., the shoulder joint) and the second position of the second anatomical features (e.g., the elbow joint) to generate a first timestamped set of feature position data; link the second time value to the first position of the first anatomical feature (e.g., the shoulder joint) and the second position of the second anatomical feature (e.g., the elbow joint) to generate a second timestamped set of feature position data; and derive the first timeseries of position data based on the first timestamped set of feature position data—representing positions of the first and second anatomical features at the first time—and the second timestamped set of feature position data, representing positions of the first and second anatomical features at the second time.

In this implementation, the system can repeat this process to collect additional timeseries of movement data for the dog moving to additional and/or repeat target locations within the working field. For example, in response to detecting the dog at the second target location—after walking, trotting, and/or running from the first target location to the second target location along the first target pathway—the system can: dispense a third unit of the primary reinforcer toward a third target location within the working field; and, in response to detecting the dog at the third target location, dispense a fourth unit of the primary reinforcer toward a fourth target location (e.g., within the working field) intersecting a second target pathway—orthogonal the first target pathway—extending from the third target location to the fourth target location and defining a second target orientation of the dog—rotated 90-degrees from the first target orientation—relative the training apparatus 100 (e.g., the optical sensor integrated within the training apparatus 100), traversing the second target pathway. Then, in response to detecting movement of the dog along the second target pathway—in a first direction (e.g., moving toward the second target pathway)—in the video feed, the system can collect a second timeseries of movement data (e.g., position data) representing changes in position of the set of anatomical features of the dog traversing the second target pathway. Therefore, in this example, the system can collect timeseries of movement data that depict the dog moving within the working field in both a first orientation—such as a forward-facing orientation—and a second orientation—such as a side-facing orientation—relative the training apparatus 100.

Additionally and/or alternatively, in a similar example, in response to detecting the dog at the second target location, the system can: dispense a third unit of the primary reinforcer toward the first target location; and, in response to detecting movement of the dog along the first target pathway—in a second direction (e.g., moving toward the first target location) opposite the first direction—in the video feed, the system can collect a second timeseries of movement data (e.g., position data) representing changes in position of the set of anatomical features of the dog traversing the first target pathway in the second direction. Therefore, in this example, the system can collect timeseries of movement data that depict the dog moving within the working field in both a first orientation—such as a first side-facing orientation—and a second orientation—such as a second side-facing orientation—relative the training apparatus 100.

Additionally and/or alternatively, in yet another example, the system can alternate dispensing units of the primary reinforcer between a first target location and a second target location—such as over multiple dispensation cycles—to collect a more robust dataset representing change in position and/or velocity of a set of anatomical features of the dog walking between the first and second target location. In this example, by repeating the same movements (e.g., along the same target pathway), the system can account for outliers in the data and/or increase confidence in recorded positions of the set of anatomical features extracted from frames of the video feed.

5.1.1.2 Transition Posture Analysis

Additionally and/or alternatively, in another implementation, the system can train the dog to transition between a set of target poses (e.g., "sit", "stand", "lie-down") in order to evaluate motion of the dog and/or motion of the set of anatomical features of the dog transitioning between these target poses. For example, the system can train the dog to transition between: a "stand" pose and a "sit" pose; a "sit" pose and a "lie-down" pose; the "stand" pose and the "lie-down" pose; etc. During each of these transitions, the system can collect a timeseries of movement data (e.g., transition data) for the set of anatomical features of the dog.

In particular, in this implementation, the system can: output a first cue—such as via activation of a visual indicator on the training apparatus 100 and/or outputting of an audible command via a speaker integrated in the training apparatus 100—associated with a first target pose; in the video feed, detect the dog in a first pose and at a first location within the working field; calculate a first target location for dispensation of a first unit of the primary reinforcer within the working field based on the first location of the dog and the first target pose; in response to the first pose falling within a threshold deviation of the target pose, output a second command associated with a second target pose; and, in response to detecting transitioning of the dog from the first pose—corresponding to execution of the first target pose by the dog—toward the second target pose, collect a first timeseries of movement data representing changes in position of a set of features (e.g., anatomical features)—such as a set of joints and/or appendages of the dog—during transition of the dog from the first target pose into the second target pose. The system can then repeat this process to collect additional timeseries of movement data for the dog transitioning between various poses.

In one example, the system can: output a "sit" command via the speaker integrated into the training apparatus 100; detect the dog in a "sit" pose (e.g., falling within a threshold deviation of a target "sit" pose); and, in response to confirming that the dog is in the "sit" pose—such as for a threshold duration—output a "lie-down" command via the speaker. Then, in response to detecting the dog transitioning from the "sit" pose toward a "lie-down" pose, the system can collect a first timeseries of position data—representing changes in position of the set of anatomical features (e.g., appendages, joints, muscles, body features) of the dog transitioning from the "sit" pose into the "lie-down" pose—such as by implementing the methods and techniques described above.

5.1.2 Static Posture Analysis

Additionally and/or alternatively, in yet another implementation, the system can leverage static images—such as frames extracted from the video feed and/or a distinct feed of images recorded by the optical sensor—depicting the dog occupying a set of poses (e.g., "sit" pose, "lie-down" pose, "stand" pose) to derive pose data (e.g., position data) for the dog based on positions of the set of anatomical features during execution of various poses by the dog. In particular, in this implementation, the system can train the dog to execute a set of poses to evaluate posture of the dog based on positions of the set of anatomical features of the dog while occupying these poses.

In particular, in this implementation, the system can train the dog to execute a pose at a target location—defining a target distance between the dog in the target pose and the training apparatus 100—and in a particular orientation (e.g., a forward-facing orientation, a side-facing orientation), relative the training apparatus 100, within the working field.

The system can therefore repeatedly: (e.g., according to a fixed schedule, periodically, pseudo-randomly) capture images of the dog in this target pose and at the target location and orientation over time; extract pose data—representing positions of the set of anatomical features of the dog in the target pose—from these images; and, by consistently capturing these images of the dog at the same target location and/or orientation within the working field, derive insights related to change in the dog's execution of the target pose over time at a high level of precision and accuracy. Further, the system can leverage this corpus of pose data collected for the dog over time to more accurately detect features of the dog and/or other features depicted in subsequent images captured of the dog.

For example, during a health analysis session for the dog, the system can initially dispense a first unit of a primary reinforcer to a first target location within a working field. Then, in response to detecting the dog at the first target location—such as within a threshold distance of the first target location, for a threshold duration and/or in response to confirming consumption of the first unit of the primary reinforcer—the system can: dispense a second unit of a primary reinforcer to a second target location—defining a target distance from the training apparatus 100—within the working field, the first and second target location cooperating to define a target pathway—extending from the first target location to the second target location—defining a target orientation relative the training apparatus 100. Therefore, the system can dispense the second unit of the primary reinforcer to the second target location to encourage the dog to move (e.g., walk) along the target pathway, from the first target location to the second target location, to retrieve the second unit of the primary reinforcer.

Then, in response to detecting the dog at the second target location—such as within a threshold distance of the first target location, for a threshold duration and/or in response to confirming consumption of the first unit of the primary reinforcer—the system can: output a "sit" command associated with a target "sit" pose; and track a pose of the dog in the video feed. In response to a current pose falling within a threshold deviation of the target "sit" pose, the system can: extract a set of position data—representing positions of a set of features (e.g., anatomical features) of the dog in the current pose—from a frame of the video feed depicting the dog in the current pose; and immediately dispense a third unit of the primary reinforcer to the dog—at and/or proximal the second target location (e.g., directly in front of the dog's feet)—such that the dog associated this third unit of the primary reinforcer with execution of the target "sit" pose responsive to the "sit" command.

Additionally, in this implementation, the system can train the dog to execute a series of poses—such as a "sit" pose, a "lie down" pose, and/or a "stand" pose—in various orientations to evaluate the dog's posture in each pose, in the series of poses, executed by the dog, as described above. For example, the system can derive pose data for the dog executing a "sit" pose, a "stand" pose, a "lie-down" pose, etc., in: a front-facing orientation; a first side-facing orientation; a second side-facing orientation opposite the first side-facing orientation; and/or a rear-facing orientation. The system can therefore assemble a set of multi-dimensional pose data for a particular pose or set of poses executed by the dog based on pose data collected for this particular pose or set of poses in multiple orientations.

5.1.3 Secondary Data

In one implementation, the system can extract additional data (or "secondary data") from video, images, and/or audio recorded by the training apparatus 100 (e.g., via a set of optical sensors) based on features detected in these videos or images.

For example, the system can derive a set of secondary data during a training session and/or during a health analysis session (e.g., a standalone health analysis session within a training session) including a set of environmental data—representing environmental conditions within and/or surrounding the working field depicted in a video feed or images captured at the training apparatus 100—including: occupancy data, such as whether a human is present, a quantity of human occupants, whether another dog is present and/or a type (e.g., species, breed) of other dog present; a location type, such as indoors or outdoors, a size of the space, a permanent home or temporary boarding facility, and/or a particular room (e.g., kitchen, basement); a background noise level (e.g., based on an audio recording captured during a training session for the dog); a floor type (e.g., tile, carpet, cement, wood); etc. Additionally and/or alternatively, in this example, the system can derive a set of dog data—representing characteristics and/or behaviors of the dog indicative of emotion, pain, anxiety, boredom, pleasure, etc.—including: sound (e.g., barking, whining, whimpering) output by the dog and recorded by the speaker; the dog's facial expressions during various movements, postures, and/or transitions; gestures and/or body language of the dog throughout a training and/or health analysis session; etc.

Additionally and/or alternatively, in this implementation, the system can interface with a set of secondary sensors—external the training apparatus 100—configured to collect additional secondary data. For example, the system can interface with a collar—worn by the dog during sessions with the training apparatus 100—including a set of sensors configured to collect biosignal data for the dog, such as a heart rate and/or a temperature of the dog. Additionally and/or alternatively, in this example, the collar can include a microphone configured to record sounds emitted by the dog during these sessions with the training apparatus 100. In another example, the system can interface with a floor mat—arranged over a floor within the working field—including a pressure sensor configured to collect pressure data, such as a weight of the dog and/or a distribution of the dog's weight during execution of various poses, transitions, or movements about the working field (e.g., during gait).

Additionally and/or alternatively, in one implementation, the system can access an audio feed (e.g., recorded by a microphone installed within the training apparatus 100) including vocalizations output by the dog during the health analysis session and/or subsequent training sessions. In this implementation, the system can leverage these dog vocalizations recorded in the audio feed to further evaluate the dog's comfort and/or ability to complete various movements (e.g., dynamic postures, walking). For example, during a health analysis session for a dog, in response to detecting no vocalizations in the audio feed while the dog is walking, the system can predict that the dog experiences minimal pain or discomfort while walking. Alternatively, in this example, in response to detecting a series of vocalizations output by the dog while walking, the system can predict that the dog experiences pain or discomfort while walking. The system can thus pair this audio feed with the video feed of the dog, recorded during this health analysis session, to output predictions regarding the dog's orthopedic and neurological health based on the dog's comfort and ability to execute these movements.

In this implementation, the system can therefore combine this secondary data with movement data (e.g., gait data, transition data, pose data) collected during this session to assemble a comprehensive set of session data representative of the training and/or health analysis session.

6. Movement Profile

In one implementation, the system can leverage movement data recorded during the health analysis session for the dog to characterize a movement profile (or "movement model") unique to the dog.

For example, the system can: initiate a health analysis session for the dog with the training apparatus 100; access a video feed of the working field adjacent the training apparatus 100; and detect the dog in the working field in the video feed. The system can then: access a first series of gait data (e.g., position and/or velocity data) corresponding to the dog walking within the working field; access a second series of pose data corresponding to the dog performing a set of poses (e.g., "sit," "stand," "down"); and access a third series of transition data corresponding to the dog transitioning between poses (e.g., "sit" to "stand," "stand" to "sit"). Based on this data, the system can: characterize a gait profile (or "gait model") for the dog based on the first series of gait data; characterize a pose profile (or "pose model")—for each pose, in a set of poses, executed—for the dog based on the second series of pose data; characterize a transition profile (or "transition model") for the dog based on the third series of transition data; and compile the gait, pose, and transition profiles into a movement profile for the dog representing movement and/or motion of the dog—and/or more specifically each anatomical feature (e.g., joint, muscle, appendage), in the set of anatomical features, of the dog—in this health analysis session. The system can then store this movement profile in the dog profile generated for this dog.

The system can then leverage this movement profile for the dog to detect form abnormalities exhibited by the dog over time due to changes in the dog's movement profile. In particular, the system: can collect additional movement data for the dog during subsequent training sessions and/or health analysis sessions with the dog at the training apparatus 100; derive additional movement profiles for the dog based on this additional movement data; and compare these additional movement profiles to the initial (or "baseline") movement profile generated for the dog during an initial health analysis session. The system can then identify changes between movement profiles for the dog to: detect acute changes—such as a sprained ankle or sore leg—to the dog's movement profile; and identify long-term changes (or "trends") in the dog's movement profile.

6.1 Gait Profile

In one implementation, the system can derive a gait profile for the dog based on gait data collected during the health analysis session. In particular, in this implementation, during a health analysis session and/or training session with the training apparatus 100, the system can: detect the dog in the working field in the video feed; and, during a test period, in response to detecting movement of the dog between a first location and a second location within the working field, collect a timeseries of position data representing changes in position of a set of features (e.g., anatomical features) of the dog during the test period. Then, based on the timeseries of position data, the system can derive a gait profile for the dog representative of the dog moving between the first and second location within the working field.

For example, the system can: extract a first position of a first anatomical feature, in the set of anatomical features, from a first frame in the video feed—recorded at a first time—depicting the dog at a first location along a target pathway extending between the first and second location within the working field; extract a second position of the first anatomical feature from a second frame in the video feed—recorded at a second time succeeding the first time—depicting the dog at a second location along the target pathway. The system can then derive a first position change, in a set of position changes, for the first anatomical feature, based on a difference between the first and second position of the first anatomical feature. The system can similarly repeat this process for each anatomical feature, in the set of anatomical features, to derive the set of position changes. The system can then: calculate a distance between the first location and the second location within the working field; calculate a time interval between the third time and the fourth time; and derive a first gait profile for the dog—representing gait of the dog during the test period—based on the set of position changes, the distance, and/or the time interval. The system can then repeat this process as the dog continues to move along the target pathway—such as from the second location to a third location along the target pathway, from the third location to a fourth location along the target pathway, etc.—and therefore update the first gait profile as additional data is collected.

The system can therefore derive a gait profile indicative of position changes of the set of anatomical features over time and/or distance. In particular, in the preceding example, the system can leverage a series of position changes—such as including a first set of position changes of the set of anatomical features between the first and second location, a second set of position changes of the set of anatomical features between the second and third location, a third set of position changes of the set of anatomical features between the third and a fourth location, etc.—to derive a set of feature pathways (e.g., joint pathways, appendage pathways, body feature pathways) corresponding to the set of anatomical features. For example, the system can derive: a first joint pathway for a first hip joint; a second joint pathway for a second hip joint; a third joint pathway for a first shoulder joint; a fourth joint pathway for a second shoulder joint; etc. The system can then compile this set of feature pathways—derived from the series of joint position changes (e.g., by interpolating positions of each anatomical feature, in the set of anatomical features, between locations along the target pathway)—to derive the gait profile for the dog.

6.2 Transition Profile

Additionally and/or alternatively, in another implementation, the system can similarly derive a transition profile for the dog based on transition data collected during the health analysis session. In particular, in this implementation, during a health analysis session and/or training session for the dog, the system can: detect the dog in the working field in the video feed; and, during a test period, in response to detecting the dog transition between a first target pose (e.g., a "sit" pose) and a second target pose (e.g., a "stand" pose), collect a timeseries of position data representing changes in position of a set of features (e.g., anatomical features) of the dog during the test period. Then, based on the timeseries of position data, the system can derive a transition profile for the dog representative of the dog moving between the first and second location within the working field.

For example, the system can: extract a first position of a first anatomical feature, in the set of anatomical features, from a first frame in the video feed—recorded at a first time—depicting the dog in a "sit" pose; extract a second position of the first anatomical feature from a second frame in the video feed—recorded at a second time succeeding the first time—depicting the dog in a first transition pose as the dog begins to transition from the "sit" pose into the "stand" pose; extract a third position of the first anatomical feature from a third frame in the video feed—recorded at a third time succeeding the second time—depicting the dog in a second transition pose as the dog transitions from the first transition pose into the "stand" pose; and extract a fourth position of the first anatomical feature from a fourth frame in the video feed—recorded at a fourth time succeeding the third time—depicting the dog in a "stand" pose. The system can then: derive a first position change, in a series of position changes for the first anatomical feature, based on a first difference between the first and second position; derive a second position change, in the series of position changes, based on a second difference between the second and third position; and derive a third position change, in the series of position changes, based on a third difference between the third and fourth position. The system can then repeat this process for each anatomical feature, in the set of anatomical features, to derive a series of position changes for each anatomical feature. The system can then leverage time values (e.g., timestamps) recorded at the first, second, third, and fourth times—in combination with these series of position changes of the set of anatomical features—to derive a transition profile for the dog transitioning between the "sit" pose and the "stand" pose.

The system can therefore derive a transition profile indicative of position changes of the set of anatomical features over time, such as rate of change in position of each anatomical feature in the set of anatomical features. In particular, in the preceding example, the system can: leverage the series of position changes of the first anatomical feature to derive a first feature pathway (e.g., joint pathway, appendage pathway, body feature pathway) corresponding to the first anatomical feature during transition between the "sit" pose and the "stand" pose; and repeat this process for each anatomical feature, in the set of anatomical features, to derive a comprehensive set of feature pathways representing movement of the set of anatomical features during this transition.

The system can similarly repeat this process for transitions between other poses and/or for transitions executed in various orientations within the working field to derive feature pathways for the set of anatomical features of the dog and compile these feature pathways into a transition profile for the dog.

6.3 Pose Profile

In one implementation, the system can derive a pose profile for the dog based on pose data collected during the health analysis session. In particular, in this implementation, during a health analysis session and/or training session for the dog with the training apparatus 100, the system can: detect the dog in the working field in the video feed; and, in response to detecting the dog in a particular pose, collect a set of position data representing position of a set of features (e.g., anatomical features) of the dog in the particular pose. Then, based on the set of position data, the system can derive a pose profile for the dog representing posture of the dog in this particular pose.

For example, in response to detecting the dog in a "sit" pose, the system can: extract a first position of a first anatomical feature, in the set of anatomical features, depicted in an image (e.g., a frame in the video feed) recorded at the training apparatus 100; extract a second position of a second anatomical feature, in the set of anatomical features, depicted in the image; and extract a third position of a second anatomical feature, in the set of anatomical features, depicted in the image. The system can then calculate: a first vector, in a set of vectors, extending between the first position of the first anatomical feature and the second position of the second anatomical feature; a second vector, in the set of vectors, extending between the first position of the first anatomical feature and the third position of the third anatomical feature; and a third vector, in the set of vectors, extending between the second position of the second anatomical feature and the third position of the third anatomical feature. The system can repeat this process for each anatomical feature, in the set of anatomical features, to derive the set of position vectors for the "sit" pose. Then, based on the set of vectors, the system can derive a pose profile representing posture (e.g., position of the set of anatomical features) of the dog in the "sit" pose. The system can similarly repeat this process to derive a pose profile for each pose, in a set of poses, executed by the dog.

7. Tracking Animal Health

In one implementation, the system can characterize health of the dog based on movement data and/or a movement profile derived for the dog. In particular, in this implementation, the system can monitor the dog's health (e.g., physical health, wellness) based on the dog's movements and/or postures—which may be indicative of various health deficiencies (e.g., orthopedic, neurological) and/or pain experienced by the dog—in preparation for and/or during autonomous training of the dog with the training apparatus 100. The system can characterize health of the dog based on differences between a (current) movement profile—such as a gait profile, a transition profile, and/or a pose profile—derived for the dog and a baseline movement profile defined for the dog.

7.1 Abnormality Detection

The system can leverage a dog-specific baseline movement profile—derived from historical movement data collected for the dog—to detect changes (or "abnormalities") in execution of various movements and/or postures (e.g., represented in a current movement profile) derived for the dog over time.

In one implementation, the system implements the methods and techniques described above to derive a baseline movement profile for the dog—including baseline gait data, baseline transition data, and/or baseline pose data—during an initial setup period, such as an initial health analysis session and/or an initial series of health analysis sessions. The system can then access this baseline movement during subsequent health analysis sessions and/or training sessions for the dog to: detect abnormalities in a current movement profile derived for the dog based on differences between the current movement profile and the baseline movement profile; and characterize health of the dog based on these detected abnormalities.

In particular, in this implementation, the system can: derive a first movement profile for the dog based on gait, transition, and/or pose data collected during a health analysis session for the dog; access a baseline movement profile derived from timeseries position data of the set of anatomical features collected for the dog during a preceding time period; and characterize a difference between the first movement profile and the baseline movement profile. Then, in response to the difference exceeding a threshold difference, the system can: flag the difference as a first abnormality in the first movement profile; and characterize health of the dog based on detection of the first abnormality.

For example, the system can: characterize a difference between positioning of a set of hip joints of the dog represented in a movement profile—derived during a training session for the dog—and positioning of the set of hip joints represented in the baseline movement profile. The system can then calculate a health score for the dog based on the difference. For example, in response to the difference exceeding a threshold difference, the system can calculate a low health score indicating poor health of the dog. Alternatively, in response to the difference exceeding a lower threshold and falling below the threshold, the system can calculate a moderate health score indicating moderate health of the dog. Alternatively, in response to the difference falling below the lower threshold, the system can calculate a high health score indicating good health.

Additionally and/or alternatively, in one variation, the system can access a global or generic baseline movement profile—such as including gait, transition, and/or pose data—corresponding to an average dog or to "healthy" dogs, such as dogs without any injuries or health disorders (e.g., neurological, physiological). Additionally, in this implementation, the system can select a particular (global) baseline movement profile, from a set of (global) baseline movement profiles, best matched to this dog, such as based on characteristics (e.g., age, size, breed, sex) of the dog. Then, in response to deriving a current movement profile for the dog—such as during a health analysis session—the system can: characterize a difference between the current movement profile and the baseline movement profile; and, based on the difference, characterize current health of the dog, as described above.

7.2 Baseline Movement Profile

Additionally and/or alternatively, in another implementation, the system can regularly update the baseline movement profile for the dog as the system derives additional movement profiles for the dog over time. In particular, in this implementation, the system can: characterize a first movement profile for the dog based on a set of movement data collected during a first training session for the dog; access a baseline movement profile—derived from an initial series of movement data collected for the dog during an initial time period preceding the first training session—for comparison with the first movement profile; and, prior to a subsequent health analysis session, update the baseline movement profile based on the first movement profile. Then, during a second health analysis session succeeding the first health analysis session, the system can: collect a second set of movement data for the dog; and access the baseline movement profile—derived from the initial series of movement data collected during the initial time period and the first set of movement data collected during the first health analysis session—for comparison with the second movement profile.

In one example, the system can: insert the set of movement data into the series of movement data; and update the baseline movement profile by equally weighting all movement data in the series of movement data. In another example, the system can: weight most-recently collected data—such as data collected within an immediately preceding time period—more heavily when updating the baseline movement profile for the dog. In particular, in this example, the system can: assign a first weight to the set of movement data; assign a second weight—less than the first weight—to the series of movement data; and update the baseline movement profile—according to the first and second weights—based on the set of movement data and the series of movement data. Additionally and/or alternatively, in another example, the system can: discard movement data stored in the baseline movement profile and collected outside of a rolling time window (e.g., one week, one month, three months, one year); and regularly update the baseline movement profile of the dog accordingly.

In one variation, the system can leverage secondary data extracted from video or images of the dog in the working field—such as noise data (e.g., presence, volume, and/or type of animal vocalizations, human voices, external sounds), occupancy data, location type, facial expression data—to selectively update the baseline movement profile over time based on these secondary data. For example, the system can account for changes in secondary data between consecutive or subsequent movement profiles (e.g., gait profile, pose profile, transition profile) derived for a dog responsive to detection of one or more abnormalities in these movement profiles.

In particular, in one example, during a first time period (e.g., corresponding to a first training and/or health analysis session), the system can: derive a first pose profile for an animal in a target pose (e.g., "sit" pose) based on a first set of position data derived from a first image—recorded at a first time—depicting the animal in a first pose—falling within a threshold deviation of the target pose—and representing positions of a set of anatomical features of the animal in the first pose at the first time; and derive a first set of environmental data, representing environmental conditions within the working field at the first time, based on characteristics of the first image. Then, during a second time period succeeding the first time period, the system can: derive a second pose profile for the animal in the target pose based on a second set of position data derived from a second image—recorded at a second time succeeding the first time—depicting the animal in a second pose—falling within the threshold deviation of the target pose—and representing positions of the set of anatomical features of the animal in the second pose at the second time; and derive a second set of environmental data, representing environmental conditions within the working field at the second time, based on characteristics of the second image. The system can then: characterize a first difference between the first pose profile and the second pose profile; and characterize a second difference between the first set of environmental data and the second set of environmental data.

In the preceding example, based on the first difference—such as in response to the first difference exceeding a threshold difference—the system can: interpret an abnormality between the second pose profile and the first pose profile; and predict a causal pathway (or "cause")—such as anxiety, acute injury (e.g., ankle sprain, a cut or sore on the dog's skin), a neurological disorder, a physiological disorder (e.g., hip dysplasia, elbow dysplasia), a lack of motivation, improper grooming (e.g., nails overgrown), change in environmental conditions, etc.—for the abnormality based on the first and second difference. The system can therefore leverage the second difference—between the first and second set of environmental data—to better predict whether the abnormality is due to: a new or changing (e.g., worsening, improving) physical or neurological condition (e.g., disorder, injury, disease, emotion) of the dog; and/or a change in environmental conditions between the first and second time period. Therefore, in this example, in response to predicting a causal pathway for the abnormality—linked to an environmental condition of the working field—the system can discard the second pose profile and/or assign a relatively lower weight to the second pose profile.

7.2.1 Trend Analysis

In one implementation, the system can track changes in the dog's movement profile over time to derive insights related to the dog's health. In particular, in this implementation, the system can compare a current movement profile to one or more historical movement profiles derived for the dog to detect trends in the dog's movement profile, such as whether a particular abnormality in the dog's movement profile is improving or worsening over time. The system can leverage identification of a particular trend or trends to predict future changes to the dog's movement profile.

For example, based on a first movement profile derived during a first health analysis session, a second movement profile derived during a second health analysis session succeeding the first health analysis session, and a third movement profile derived during a third health analysis session succeeding the second health analysis session, the system can detect a change in position of a particular anatomical feature, in the set of anatomical features, at a particular rate of change. Based on this particular rate of change, the system can predict whether this abnormality in position of the particular anatomical feature is indicative of: an acute injury and/or a short-term health issue such as based on a relatively high rate of change; or a long-term health disorder, such as based on a relatively low rate of change. The system can also predict a future position of the particular feature at a particular time based on the rate of change and notify a user (e.g., a dog owner) of this prediction.

Additionally and/or alternatively, in one implementation, the system can compare changes in positioning or movements of different anatomical features over time to detect abnormalities in the dog's movement profile.

For example, the system can: access a first position (e.g., relative a defined point of origin) of a first joint (e.g., a right-side hip joint) derived from a first image of the dog—captured during a first time period—in a target pose (e.g., "sit" pose, "stand" pose, "lie-down" pose, "heel" pose); access a second position (e.g., relative the defined point of origin) of a second joint (e.g., a left-side hip joint)—configured to mirror positioning of the first joint in the target pose—derived from the first image; access a third position of the first joint and derived from a second image of the dog—captured during a second time period—in the target pose; and access a fourth position of the second joint and derived from the second image. Then, the system can: calculate a first ratio of the first position to the second position; calculate a second ratio of the third position to the fourth position; and, based on a difference between the first and second ratio, interpret an abnormality in positioning of the first and/or second joint during execution of the target pose. In particular, in one example, in response to the first ratio exceeding the second ratio (e.g., by more than a threshold deviation), the system can flag the first joint as: decreasing in distance from a central axis of the dog's body at a faster rate than the second joint; and/or increasing in distance from the central axis at a slower rate than the second joint. Alternatively, in another example, in response to the second ratio exceeding the first ratio (e.g., by more than a threshold deviation), the system can flag the first joint as: decreasing in distance from the central axis at a slower rate than the second joint; and/or increasing in distance from the central axis at a faster rate than the second joint.

7.3 Causal Pathway

In one implementation, the system can predict a causal pathway for detected changes in the dog's movement profile over time. In particular, in this implementation, in response to detecting an abnormality in the dog's movement profile—such as a change in position of a particular joint or appendage in the "sit" pose and/or a change in motion of a group of joints in the dog's gait—the system can predict a causal pathway (e.g., an acute physical injury, a physiological disorder, a neurological disorder, an environmental condition, pain experienced by the dog, a physical characteristic of the dog) associated with the abnormality.

For example, the system can: access a timeseries of position data representing changes in position of a set of anatomical features (e.g., joints, appendages, bodily regions) of the dog during a gait test period; derive a gait profile—representative of the dog's gait during the gait test period—based on the timeseries of position data; access a baseline movement profile derived from timeseries position data of the set of anatomical features collected for the dog during a preceding time period, such as during an immediately-preceding gait test period and/or during a series of preceding gait test periods; and, based on a difference between the gait profile and the baseline movement profile, interpret presence of an abnormality—such as in position of a subset of anatomical features (e.g., a group of related and/or complementary features) in the set of anatomical features—in the dog's gait during the gait test period. The system can then predict a causal pathway for the abnormality based on the detected change in position of the subset of anatomical features.

In particular, in one example, the system can: detect an abnormality in motion of a first subset of anatomical features—such as a foot, a leg, an ankle, and/or corresponding joints or muscles—corresponding to limping of the dog; and predict an acute leg, ankle, and/or foot injury based on the detected abnormality in the first subset of anatomical features. In another example, the system can: detect an abnormality in motion of a second subset of anatomical features—such as a hip joint, a leg, a thigh, a femur, etc.—corresponding to decreased range of motion; and predict onset of hip dysplasia based on the detected abnormality in the second subset of anatomical features. Additionally, in another example, the system can: detect an abnormality in motion of a third subset of anatomical features—such as in orientation of the feet of the dog during movement—corresponding to discomfort of the dog during walking; and predict that the dog is overdue for nail trimming based on the detected abnormality in the third subset of anatomical features. In yet another example, the system can: detect an abnormality in velocity of the dog—and therefore the set of anatomical features—corresponding to the dog walking more slowly between locations in the working field; and predict that the dog is currently tired, bored, or unmotivated.

Further, the system can selectively predict a causal pathway for a particular abnormality based on a confidence score calculated for this causal pathway. For example, the system can: characterize a difference between a current movement profile and the baseline movement profile; and, in response to the difference exceeding a threshold difference, interpret a first abnormality in the first movement profile for the dog. Then, the system can: characterize a first confidence score for a first causal pathway, in a set of causal pathways, for the first abnormality, based on the difference and characteristics of the set of anatomical features and/or a subset of anatomical features, in the set of anatomical features, corresponding to the first abnormality. Then, based on the first confidence score—such as in response to the first confidence score exceeding a threshold confidence score and/or in response to the first confidence score exceeding a confidence score of each other causal pathway in the set of causal pathways—the system can predict the first causal pathway for the first abnormality.

The system can thus predict a causal pathway—for a particular abnormality—corresponding to: a particular health diagnosis (e.g., an injury, a neurological or physiological disorder) for the dog; an environmental condition (e.g., noise, human presence, clutter, location); a characteristic of the dog (e.g., nail length, weight gain, weight loss); mental state of the dog (e.g., anxious, tired, unmotivated, hungry, bored); etc. Additionally, the system can leverage characteristics of the dog—such as age, (prior—current) known health issues, breed, size, sex, historical behaviors, training level or ability—to better predict a causal pathway associated with a detected abnormality.

7.4 Diagnostic Model

The system can access a (global) diagnostic model linking movement data to various form abnormalities exhibited by dogs—such as abnormalities in the dog's gait, poses, and/or transitions. The system can then leverage this diagnostic model to interpret a "diagnosis" corresponding to a particular form abnormality exhibited by the dog.

For example, during an initial health analysis session with the dog, the system can: execute a health analysis training protocol (e.g., as described above); and record a series of movement data (e.g., position, velocity) corresponding to the dog's gait, poses, and transitions (e.g., between poses) throughout the health analysis session. Then, the system can: access a global diagnostic model linking movement data to a set of form abnormalities exhibited by dogs; estimate a confidence score for a particular form abnormality, in the set of form abnormalities, based on the series of movement data and the global diagnostic model; and, in response to the confidence score exceeding a threshold confidence score, detect presence of the particular form abnormality and interpret a particular diagnosis (e.g., a physiological or neurological health diagnosis) corresponding to the particular form abnormality. Alternatively, in response to the confidence score falling below the threshold score, the system can detect absence of the particular form abnormality. The system can repeat this process for each form abnormality, in the set of form abnormalities.

In one implementation, the system can: query a remote database for a global diagnostic model trained on images of dogs of an age, breed, size, shape, and/or coat length, etc. that are the same or similar to characteristics stored in the dog's profile; and then download this global diagnostic model from the remote database, such as over the internet or via the user's smartphone or tablet. Similarly, the native application, the system, and/or the remote computer system can: tune a generic diagnostic model based on various characteristics stored in the dog profile; or select one diagnostic model—from a corpus of existing diagnostic models—developed to detect form abnormalities (e.g., gait, pose, and/or transition pose abnormalities) of dogs exhibiting various characteristics similar to those of the dog. The system can then implement a local copy of this diagnostic model to rapidly detect form abnormalities of the dog in images recorded by the system during a health analysis session with the dog. By accessing a diagnostic model "tuned" to detecting form abnormalities of dogs exhibiting characteristics similar to those aggregated into the dog's profile during setup, the system may detect form abnormalities of the dog in the working field more quickly and with increased confidence. Alternatively, the system can implement a generic diagnostic model to detect form abnormalities of the dog in the working field, such as if limited information about the dog is provided by the user during setup.

8. Mitigation Protocol

In one implementation, the system can select a mitigation protocol—configured to minimize health risks and/or alleviate symptoms of pain experienced by the dog—based on detection of an abnormality in the dog's movement profile and/or based on a causal pathway predicted for this abnormality. In particular, the system can assemble a mitigation protocol configured to monitor, improve, and/or limit decline in dog health. For example, the mitigation protocol can include a modified training protocol—for loading onto the training apparatus 100 and implementing during health analysis sessions and/or training sessions with the dog—configured to minimize disruption to training while limiting health risks and/or discomfort experienced by the dog, thereby encouraging the dog to participate in further sessions. Additionally and/or alternatively, in this example, the mitigation protocol can include a treatment protocol—for suggesting to a user associated with the dog—predicted to further: monitor the dog's health or an abnormality detected in the dog's movement profile; alleviate, improve, and/or prevent worsening of the dog's health or the abnormality; and/or suppress or limit a causal pathway linked to the abnormality.

In one implementation, the system can select a mitigation protocol for the dog based on form abnormalities (e.g., gait abnormalities, posture and/or alignment abnormalities) detected during the health analysis session. For example, in response to detecting a first abnormality (e.g., a gait abnormality), in a set of abnormalities, during an initial health analysis session for the dog, the system can: predict a first causal pathway—such as a particular diagnosis (e.g., physiological or neurological diagnosis), an environmental condition, a change in the dog's appearance (e.g., long nails, weight gain), a time of day, etc.—for the first abnormality; access a catalog of treatment protocols, each treatment protocol, in the catalog of treatment protocols, corresponding to a particular causal pathway, in a set of causal pathways, and/or abnormality in the set of abnormalities; and select a first treatment protocol, in the catalog of treatment protocols, corresponding to the first causal pathway and/or the first abnormality. Alternatively, in response to predicting a second causal pathway, in the set of causal pathways, for the first abnormality, the system can select a second treatment protocol, in the catalog of treatment protocols, corresponding to the second causal pathway. Further, in this example, the system can: generate a prompt indicating detection of the first abnormality and suggesting implementation of the first treatment protocol; and transmit the prompt to a user associated with the dog.

In particular, in one example, in response to detecting a hip injury for the dog, the system can select a particular treatment—for improving this detected hip injury—for the dog, such as further evaluation or medical treatment by a veterinarian, rest, a particular diet change, and/or therapeutic exercise. The system can then inform the user of the detected hip injury and suggest this particular treatment to the user. Alternatively, in another example, in response to detecting a length of the dog's nail exceed a threshold length, the system can select a particular treatment for the dog—such as trimming of the dog's nails according to a particular schedule—and inform the user of this particular suggested treatment.

9. Autonomous Training Sessions

After a dog has completed a set of health analysis and/or acclimation sessions, the remote computer system can access a first training protocol corresponding to a particular skill or behavior (e.g., "sit", "stay", "down") and define a first training session for the dog. The training apparatus 100 can then initiate the first training session with the dog. For example, during the first training session, the system and/or training apparatus 100 can: capture a video feed of a field near the training apparatus 100; detect the dog in the video feed; output a command (e.g., "sit," "stay", "come," "no bark"); detect an action of the dog in the video feed responsive to the command; and dispense a unit of the primary reinforcer in response to detection of the action corresponding to the command. Generally, the system and/or training apparatus 100 can execute methods and techniques described in U.S. patent application Ser. No. 16/418,596, filed on 21 May 2019, which is incorporated in its entirety by this reference.

In one implementation, the system can select a training protocol configured to monitor and/or improve the dog's gait based on the results of the initial health analysis session. For example, in response to recording a slow (e.g., hesitant) transition (e.g., a below average velocity compared to other dogs with similar characteristics) from a "down" pose into a "stand" pose during an initial health analysis session for the dog, the system can: detect a form abnormality corresponding to the "down-to-stand" transition; select a first training protocol—such as from a predefined set of training protocols—for the dog for a first training session; locate each instance of the "down-to-stand" transition in the first training protocol; and replace each of these instances of the "down-to-stand" transition with a "down-to-sit" transition and "sit-to-stand" transition, thereby enabling the dog to gradually move from the "down" pose, to the "sit" pose, and finally into the "stand" pose. Therefore, the system can configure and/or adjust a training protocol for autonomous training sessions with the dog based on form abnormalities detected during health analysis sessions to: prevent worsening of an injury corresponding to the form abnormality; promote rehabilitation of various form abnormalities over time to improve the dog's exercise form (e.g., gait, posture, alignment); and/or enable recovery from a health issue (e.g., neurological or physiological) causing a particular form abnormality exhibited by the dog. Additionally, in this example, the system can: generate a notification indicating detection of the form abnormality; and transmit the notification to the user associated with the dog for further evaluation of the form abnormality (e.g., by an animal specialist, veterinarian, or training coach).

Additionally and/or alternatively, in another implementation, the system can leverage training sessions with the dog at the training apparatus 100 to train the dog a series of movements configured to monitor the dog's gait and other postural movements. For example, during an autonomous training session with the dog, the system and/or training apparatus 100 can: output a "circle" command to the dog (e.g., via a speaker integrated into the training apparatus 100) to walk in a circle; and dispense a series of treats in a circular pattern to encourage the dog to walk in a circle following the circular pattern. Therefore, over time, the system can train the dog the "circle" command. The system can then leverage this "circle" command to evaluate the dog's gait during both autonomous training session and health analysis sessions with the dog.

9.1 Health Analysis During Training Sessions

The system can continue monitoring the dog's health during autonomous training sessions with the dog based on the dog's exercise form (e.g., body position, body velocity) during various exercises performed by the dog during training sessions. By continuously monitoring the dog's form (e.g., gait, pose, and/or transition form) before, during, and/or after training sessions, the system can identify new and/or recurring changes to movement data collected over time for this dog.

In one implementation, the system can leverage movement data collected during autonomous training sessions with the dog at the training apparatus 100 to: detect form abnormalities based on differences between current movement data and historical movement data stored in the dog's baseline movement profile; estimate a magnitude of these changes to discern between acute changes (e.g., changes of a higher magnitude)—such as due to an acute injury or an environmental change for the dog—and more subtle changes (e.g., changes of a lesser magnitude), which may be indicative of a long-term shift in the dog's form and/or a chronic health-related issue. The system can then leverage these detected changes to: update a current training protocol for the dog; suggest a particular diagnosis and/or treatment for the dog; and predict future changes to the dog's exercise form and/or health.

For example, during a training session with the dog at the training apparatus 100, the system and/or training apparatus 100 can: access a video feed of the working field adjacent the training apparatus 100; detect the dog in the video feed; output commands according to a current training protocol (e.g., a "down" training protocol) for the dog; and selectively dispense treats into the working field based on behaviors performed by the dog responsive to these commands. Further, the system can: extract a set of current movement data (e.g., "stand-to-down" transition data, "down-to-stand" transition data, "down" pose data) from the video feed of the dog; access a set of historical movement data (e.g., stored in the baseline movement profile) for the dog, such as corresponding to the current training protocol; and characterize a difference between the current movement data and the historical movement data. Then, in response to this difference exceeding a threshold difference, the system can: flag this difference as an "acute" form abnormality; and access a diagnostic model to predict a particular causal pathway (e.g., sprained ankle, torn muscle, the dog is unmotivated) corresponding to the "acute" form abnormality. The system can then update the current training protocol to mitigate the detected form abnormality and/or prompt the user to seek professional evaluation for her dog. Alternatively, in response to the difference falling below the threshold difference, the system can: flag this difference as a form abnormality for further evaluation; and continue to track the form abnormality during subsequent training sessions with the dog. If the form abnormality continues to worsen, the system can confirm the form abnormality and interpret a particular causal pathway (e.g., a diagnosis) for the dog (e.g., based on the diagnostic model).

Additionally, in another implementation, the system can leverage historical movement data—such as from a preceding set of health analysis and/or training sessions—stored in the dog's baseline movement profile to characterize the dog's motivation during autonomous training sessions and/or during additional health analysis sessions with the dog. For example, during a training session for the "sit" command with the dog at the training apparatus 100, the system and/or training apparatus 100 can: access a video feed of the working field adjacent the training apparatus 100; detect the dog in the video feed; output a first "sit" command; and, in response to detecting the dog in the "sit" pose, dispense a first treat into the working field. In this example, the system can similarly characterize the dog's movement between dispensation of the first treat and consumption of the first treat by the dog to characterize a motivation level of the dog during this training session. In particular, the system can: estimate a first duration between dispensation of the first treat and consumption of the first treat; access a historical duration (e.g., stored in the dog's baseline movement profile) such as an average duration between dispensation of treats and consumption of treats by the dog during a set of preceding training sessions (e.g., during the training session the day before, during training sessions in the previous week); and characterize a motivational level of the dog for this training session based on a difference between the first duration and the historical duration. In this example, the system can characterize the dog's motivational level as: "high" if the difference is relatively large and the first duration is less than the historical duration; "typical" for the day if the difference is relatively low; or "low" if the difference is relatively large and the first duration is greater than the historical duration. The system can then modify the training session (e.g., in real-time) based on the dog's motivational level. The system can similarly leverage other historical movement data to characterize the dog's motivational level during training sessions, such as: duration of transitions between poses; velocity of the dog's movements (e.g., during gait); accuracy of poses responsive to commands; etc.

Further, over time, the system can identify particular exercises or training protocols that lead to changes to the dog's movement data. For example, over time, the system can "learn" that the dog exhibits a form abnormality—such as corresponding to alignment of the dog's hips—after completing the "sit" protocol. The system can therefore account for this expected misalignment in a next training session following completion of the "sit" protocol. Further, the system can modify the "sit" protocol to alleviate the form abnormality, such as by reducing a quantity of iterations of the "sit" pose.

9.2 Intervention

In one variation, the system can modify and/or update a training protocol during a training session in (near) real time based on the dog's exercise form (e.g., gait, posture and/or velocity during transition poses) and/or velocity (e.g., static and dynamic) during various exercised throughout the training session.

For example, in this variation, the system can: access a video feed of a working field recorded by the training apparatus 100 during a training session; detect the dog in the video feed; detect a series of movements performed by the dog corresponding to the dog walking in the working field; characterize a current gait profile for the dog based on the series of movements; access the baseline gait profile (e.g., stored in the baseline movement profile) generated for the dog; characterize a difference between the current gait profile and the baseline gait profile; and, in response to the difference exceeding a threshold difference, identify a gait abnormality. Then, the system can load a health analysis protocol onto the training apparatus 100 and trigger the training apparatus 100 to: terminate the current training session; and automatically initiate a health analysis session according to the health analysis protocol for further evaluation of the gait abnormality detected in the video feed. In this example, the system can select different health analysis protocols based on type, intensity, and/or duration of the detected gait abnormality. Additionally and/or alternatively, based on the type, intensity, and/or duration of the gait abnormality, the system can: automatically terminate the training session; and alert a user (e.g., via her mobile device) of the detected gait abnormality and/or prompt the user to consult a veterinarian for further evaluation.

10. Recurring Health Analysis Sessions

In one variation, the system can schedule a series of health analysis sessions for the dog, such as immediately before a scheduled training session for the dog or at a particular time each week (e.g., distinct from and/or during training sessions). In this variation, the system can leverage movement data captured during these health analysis sessions to regularly update the movement profile for the dog and evaluate the dog's health accordingly. In particular, the system can: compare current movement data to historical movement data (e.g., stored in the baseline movement profile) for the dog; and detect changes in movement data based on this comparison to identify form abnormalities.

In one implementation, the system can leverage movement data collected during health analysis sessions to characterize a (current) movement profile for the dog. The system can then compare this movement profile to a preceding movement profile generated for the dog to detect form abnormalities. In particular, the system can: characterize a first movement profile (e.g., gait profile, pose profile, and/or transition profile) for the dog based on movement data (e.g., gait data, pose data, transition data) captured during a first health analysis session for the dog; characterize a second movement profile for the dog based on movement data captured during a second health analysis session for the dog; characterize a difference between the first movement profile and the second movement profile; and, in response to the difference exceeding a threshold difference, identify a form abnormality for the dog. The system can then select a particular training protocol for the dog based on this form abnormality and/or suggest a particular treatment pathway to the user for mitigating the form abnormality.

For example, the system can characterize a first gait profile for the dog during a first health analysis session with the dog at the training apparatus 100, the first gait profile including: a first series of stride data; a first series of position data; and a first series of velocity data. Then, at a later time, the system can characterize a second gait profile for the dog during a second health analysis session with the dog at the training apparatus 100, the second gait profile including: a second series of stride data; a second series of position data; and a second series of velocity data. The system can characterize a difference between the first gait profile and the second gait profile by: calculating a first deviation between the first and second series of stride data; calculating a second deviation between the first and second series of position data; and calculating a third deviation between the first and second series of velocity data. Then, in this example, in response to the third deviation exceeding a threshold deviation, the system can identify a gait abnormality corresponding to gait velocity, such as a decreased velocity or imbalanced velocity between the dog's left and right side. Based on this detected gait abnormality, the system can: update the dog's current training protocol to limit movements affected by the gait abnormality; interpret a particular diagnosis (e.g., such as based on the diagnostic model) corresponding to the gait abnormality; and/or prompt the user to consult her veterinarian for further evaluation.

Further, in this implementation, the system can monitor whether a previously detected form abnormality is improving over time and/or confirm effectiveness of a particular mitigation protocol, such as including a particular training protocol and/or a particular treatment pathway (e.g., implemented by a trained professional). For example, during a first training session, in response to detecting an abnormality of a first magnitude in a first movement profile for the dog—such as in a particular pose profile, transition profile, and/or gait profile—the system can: predict a causal pathway for this abnormality (e.g., based on the diagnostic model); and select a mitigation protocol—configured to mitigate the abnormality and/or limit further injury and/or pain experienced by the dog—based on the causal pathway. Later, during a second training session, the system can: derive a second movement profile for the dog; characterize a second magnitude of the abnormality based on the second movement profile; and, in response to the second magnitude falling below the first magnitude, confirm selection of the mitigation protocol. Alternatively, in response to the second magnitude exceeding the first magnitude, the system can select an alternative mitigation protocol in replacement of the mitigation protocol.

The system can therefore identify effective methods, training protocols, and/or treatments for mitigating a particular form abnormality for the dog and store this information in the dog profile. Then, at a later time, in response to detecting another instance of the particular form abnormality, the system can: access the dog profile; identify a particular training protocol matched to this form abnormality for this dog; and immediately implement the particular training protocol.

In one implementation, the system can identify patterns in the dog's movement profiles over time, such as at a particular time of day (e.g., morning, afternoon, evening) and/or after a particular activity (e.g., a meal, a walk, a training session, a nap). In this implementation, the system can execute health analysis and/or training sessions with the dog in various states—such as within a threshold duration of waking up in the morning, before and/or after exercise (e.g., a walk, a training session), before and/or after a meal, within a threshold duration of a scheduled bed-time for the dog, etc.—and identify differences in the dog's movements or postures in these various states. The system can therefore leverage these expected differences in the dog's movements and/or postures in various states to account for changes detected over time.

For example, over time, the system can: derive a first average gait velocity (e.g., walking velocity) for the dog in the morning (e.g., within one hour of waking up); and derive a second average gait velocity—exceeding the first average gait velocity—for the dog in the evening (e.g., after dinner and before a scheduled bed-time for the dog). In another example, over time, the system can: derive a first average gait velocity for the dog during an initial portion of a training session, such as an initial 5-minute period, 10-minute period, 30-minute period, etc.; and derive a second average gait velocity—less than the first average gait velocity—for the dog during a final portion of the training session succeeding the initial portion—may be lower in the morning than in the evening. In each of these examples, the system can therefore account for expected changes in the dog's gait velocity at various times of day and detect and/or discard abnormalities accordingly.

In one implementation, the system can schedule a series of health analysis sessions for the dog at set time intervals, such as once per day, once per week, once per month, etc. In another implementation, the system can schedule a health analysis session prior to each training session with the dog. For example, the system can initiate a 60-second health analysis session with the dog prior to a training session for the dog. At an expiration of the 60-second health analysis session, the system can immediately initiate the training session for the dog according to a specified training protocol (e.g., stored in the dog profile).

11. User Feedback

The system can transmit notifications to the user indicating detection of form abnormalities or diagnoses related to health of the user's dog. The system can also suggest treatments, mitigation techniques, and/or professional evaluation (e.g., by a veterinarian) to the user responsive to detecting a particular form abnormality. For example, in response to detecting a form abnormality—such as an imbalanced weight distribution between the dog's legs—corresponding to a knee joint injury for the dog, the system can: generate a notification: indicating detection of the form abnormality; indicating interpretation of a possible knee joint injury; and including a suggestion that the user bring her dog to her veterinarian for further evaluation and that the dog avoid exercise in the meantime. The system can then transmit this notification to the user (e.g., via text message, via the native application).

In one implementation, the system can selectively distribute notifications to the user based on risk and/or estimated confidence associated with a particular abnormality and/or diagnosis derived from the abnormality.

11.1 User Input

In one implementation, the system can prompt the user to periodically confirm instances of detected form abnormalities and/or particular diagnoses for the dog in order to further refine the diagnostic model for the dog. For example, during a training session with the dog, the system can: access a video feed of the working field adjacent the training apparatus 100; detect the dog in the video feed; and extract a set of movement data for the dog corresponding to the dog's form while executing various movements (i.e., exercises). The system can then: access a global model linking movement data (e.g., gait data, pose data, transition pose data) of dogs to a set of gait abnormalities corresponding to a set of diagnoses (e.g., orthopedic and/or neurological); detect a particular gait abnormality based on the set of movement data and the global diagnostic model; interpret a particular diagnosis based on the gait abnormality and the global model; generate a prompt indicating presence of the gait abnormality and suggesting the user schedule an appointment for her dog with a veterinarian to evaluate the gait abnormality and/or confirm the particular diagnosis; and transmit the prompt to the user associated with the dog.

Then, at a second time succeeding the first time (e.g., by a day, by a week, by a month), the system can prompt the user to confirm the particular diagnosis, as evaluated by her veterinarian, and/or to enter an updated diagnosis provided by the veterinarian. The system can then leverage this information entered by the user to confirm or reject the particular diagnosis for the dog; identify false-negative and/or false-positive instances of the particular diagnosis; and update the diagnostic model for this dog. In particular, in response to the user confirming the particular diagnosis, the system can: label images of the dog corresponding to the detected gait abnormality with the particular diagnosis; and store these labelled images in the diagnostic model.

12. Third-Party Feedback

In one variation, the system can prompt the user to share all or part of the dog profile for her dog with a third-party user (e.g., a veterinarian, an animal specialist, an animal trainer) running the native application (or a web application) on a different device such that the system can update the third-party user with certain data about the user's dog (e.g., gait abnormalities, training updates, health trends).

For example, in this variation, the system can host or interface with a coach portal (e.g., via native application or web application)—executing on a computing device (e.g., a smartphone, a tablet, a desktop computer) of a training coach (e.g., a certified dog trainer, a veterinarian)—to: extract insights from training data (e.g., images recorded during training sessions with the dog); configure a series of training protocols (e.g., for execution during a series of health analysis sessions and/or training sessions) for the user's dog; configure a treatment plan for a particular gait abnormality exhibited by the dog; and/or to provide suggestions to the user for improving her dog's gait and overall health. In this example, the system can generate and transmit notifications to both the user and the training coach regarding the dog's health (e.g., physiological and/or neurological) and/or performance during health analysis sessions and/or training sessions with the dog.

In one implementation, the system can interface with the coach (e.g., via the coach portal) to develop and/or update the diagnostic model and/or movement profile for analyzing the dog's gait, alignment (e.g., posture) during poses, and/or transitions (e.g., alignment and velocity) between poses. For example, the system can: access video feeds for each health analysis session recorded by the training apparatus 100 during an initial setup period; and transmit these video feeds to the training coach at the training portal for analysis. At the coach portal, the system can prompt the coach to label instances of a set of movements and/or poses performed by the dog, such as: instances of the dog in the "sit" pose; instances of the dog in the "stand" pose; instance of the dog in a "down" pose; instances of the dog in a "sit-to-stand" transition pose (e.g., transitioning. between the "sit" and "stand" pose); instances of the dog in a "stand-to-sit" transition pose (e.g., transitioning between the "stand" and "sit" pose); instances of the dog walking (e.g., in various directions and/or orientations relative the training apparatus 100); instances of the dog walking in a circle; instances of the dog trotting (e.g., in various directions and/or orientations relative the training apparatus 100); etc. Based on these labels, the system can develop and/or update the diagnostic model for this particular dog for analyzing behaviors (e.g., body mechanics) of the dog exhibited during future health analysis and/or autonomous training sessions.

Additionally and/or alternatively, in this implementation, the system can interface with the coach to identify abnormalities in the dog's gait, static postures, and/or transition postures. For example, the system can: access video feeds for each health analysis session and/or training session recorded by the training apparatus 100; and transmit these video feeds to the training coach at the training portal for analysis. At the coach portal, the system can prompt the coach to label instances of form abnormalities (e.g., abnormalities in gait, poses, and/or transitions) during various exercises, such as: imbalance of the dog's weight distribution between hips in the "sit" pose; slow transition between the "stand" pose and the "sit" pose; uneven stride lengths and/or durations while walking; etc. Based on these labels, the system can develop and/or update the diagnostic model to enable rapid detection of these abnormalities in future video feeds of the dog.

13. Variation: No Training Apparatus

In one variation, the system can execute Blocks of the method S100 to monitor the dog's health independently of the training apparatus 100. In particular, in this variation, the system can interface with a native application or web application—executing on the user's computing device (e.g., mobile phone, tablet, desktop computer)—to: access images (e.g., video frames, photos) of the dog uploaded by the user; and extract insights related to the dog's health based on movement data extracted from these images.

For example, the user can download the native application to her smartphone. The system can then prompt the user—via the native application—to: create a dog profile for her dog within the native application; and manually populate the dog profile with various information, such as a name, breed, age, and/or size of her dog. The system can then prompt the user to record and upload (e.g., to the native application) a video (or videos) of her dog walking in various directions and/or orientations relative to a camera on her smartphone. Once the user uploads the video to the native application, the system can: extract a series of gait data (e.g., position and/or velocity data) based on the movements of the dog in the video; access a global diagnostic model linking gait data to a set of gait abnormalities exhibited by dogs; and, interpret a set of confidence scores for the set of gait abnormalities based on the series of gait data and the global diagnostic data. In response to a first confidence score, in the set of confidence scores, exceeding a threshold confidence score, the first confidence score corresponding to a first gait abnormality, the system can generate a notification: indicating presence of the first gait abnormality and the first confidence score; and suggesting that the user schedule an appointment with her veterinarian for further evaluation of her dog. Additionally and/or alternatively, in this example, the system can include a link to a virtual conference (e.g., video and/or messaging) with an animal specialist (e.g., veterinarian, training coach) to discuss and/or further evaluate the first gait abnormality.

Additionally and/or alternatively, in this variation, the system can interface with a set of secondary sensors—external the training apparatus 100—configured to collect movement data for the dog remote from the training apparatus and/or working field. In particular, in this variation, the system can access movement data—such as position and/or velocity data of the dog—recorded by a sensor integrated into a wearable device (e.g., a collar) worn by the dog between health analysis and/or training sessions between the dog and the training apparatus.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for monitoring health of an animal during autonomous training with a training apparatus, comprising:
   during a first training session for an animal:
      accessing a video feed recorded by an optical sensor defining a field of view intersecting a working field and integrated into the training apparatus configured to dispense units of a primary reinforcer toward a range of locations within the working field via a dispenser integrated into the training apparatus; and
      in the video feed, detecting the animal in the working field;
   at a first time during the first training session, dispensing a first unit of the primary reinforcer toward a first target location within the working field;
   at a second time succeeding the first time during the first training session, in response to detecting the animal at the first target location, dispensing a second unit of the primary reinforcer toward a second target location within the working field and intersecting a target pathway extending from the first target location to the second target location;
   during a first test period succeeding the second time during the first training session, in response to detecting movement of the animal along the target pathway in the video feed, collecting a first timeseries of position data representing changes in position of a set of anatomical features of the animal during the first test period;
   deriving a first movement profile for the animal based on the first timeseries of position data, the first movement profile representing movement of the animal along the target pathway during the first test period;
   accessing a baseline movement profile derived from timeseries position data of the set of anatomical features collected for the animal during a preceding time period;
   characterizing a difference between the first movement profile and the baseline movement profile; and
   in response to the difference exceeding a threshold difference:
      interpreting a first abnormality in the first movement profile for the animal;
      predicting a first causal pathway for the first abnormality based on the difference and characteristics of the first abnormality; and
      selecting a first mitigation protocol for the animal based on the first abnormality and the first causal pathway.

2. The method of claim 1:
   wherein predicting the first causal pathway for the first abnormality based on the first abnormality type comprises:
      characterizing a first confidence score for the first causal pathway based on the difference; and
      based on the first confidence score, predicting the first causal pathway; and wherein selecting the first mitigation protocol based on the first abnormality type and the first causal pathway comprises selecting the first mitigation protocol based on the first abnormality type, the first causal pathway, and the first confidence score.

3. The method of claim 2:
wherein predicting the first causal pathway based on the first confidence score comprises, in response to the first confidence score exceeding a first threshold confidence, predicting the first causal pathway; and
further comprising, in response to the first confidence score exceeding a second threshold confidence and falling below the first threshold confidence:
  loading a health analysis protocol, onto the training apparatus, configured to further evaluate the first abnormality;
  during execution of the health analysis protocol, collecting a second timeseries of position data representing changes in position of the set of anatomical features during execution of the health analysis protocol;
  updating the first movement profile for the animal based on the second timeseries of position data;
  characterizing a second difference between the first movement profile and the baseline movement profile;
  characterizing a second confidence score for the first causal pathway based on the second difference and characteristics of the first abnormality; and
  in response to the second confidence score exceeding the threshold confidence, predicting the first causal pathway for the first abnormality.

4. The method of claim 1:
wherein dispensing the second unit of the primary reinforcer toward the second target location intersecting the target pathway comprises dispensing the second unit of the primary reinforcer toward the second target location intersecting the target pathway defining a first target orientation of the animal, relative the optical sensor, traversing the target pathway; and
further comprising, during the first training session:
  at a third time succeeding the first test period, dispensing a third unit of the primary reinforcer toward a third target location within the working field;
  at a fourth time succeeding the third time, in response to detecting the animal at the third target location, dispensing a fourth unit of the primary reinforcer toward a fourth target location within the working field and intersecting a second target pathway:
    extending from the third target location to the fourth target location;
    orthogonal the first target pathway; and
    defining a second target orientation of the animal, relative the optical sensor, traversing the second target pathway; and
  during a second test period succeeding the fourth time, in response to detecting movement of the animal along the second target pathway in the video feed:
    collecting a second timeseries of position data representing changes in position of the set of anatomical features of the animal during the second test period;
    deriving a second movement profile for the animal based on the second timeseries of position data, the second movement profile representing movement of the animal along the target pathway during the second test period; and
    deriving a composite movement for the animal for the first training session based on the first movement profile and the second movement profile.

5. The method of claim 1:
wherein collecting the first timeseries of position data in response to detecting movement of the animal along the target pathway comprises collecting the first timeseries of position data in response to detecting movement of the animal in a first direction along the target pathway;
wherein deriving the first movement profile representing movement of the animal along the target pathway comprises deriving the first movement profile representing movement of the animal along the target pathway in the first direction; and
further comprising:
  at a third time succeeding the first test period, dispensing a third unit of the primary reinforcer toward the first target location; and
  during a second test period succeeding the third time, in response to detecting movement of the animal along the target pathway in a second direction, opposite the first direction, in the video feed:
    collecting a second timeseries of position data representing changes in position of the set of anatomical features of the animal during the second test period; and
    deriving a second movement profile for the animal based on the second timeseries of position data, the second movement profile representing movement of the animal along the target pathway in the second direction during the second test period.

6. The method of claim 1:
wherein predicting the first causal pathway for the first abnormality based on the difference and characteristics of the first abnormality comprises:
  characterizing a first confidence score for the first causal pathway based on the difference and the first abnormality type;
  characterizing a second confidence score for a second causal pathway based on the difference and the first abnormality type; and
  in response to the first confidence score exceeding the second confidence score, predicting the first causal pathway for the first abnormality; and
wherein selecting the first mitigation protocol based on the first abnormality type and the first causal pathway comprises selecting the first mitigation protocol based on the first abnormality type, the first causal pathway, and the first confidence score.

7. The method of claim 1:
wherein interpreting the first abnormality in the first movement profile comprises interpreting the first abnormality in the first movement profile, the first abnormality corresponding to motion of a first subset of anatomical features in the set of anatomical features;
wherein predicting the first causal pathway for the first abnormality comprises predicting the first causal pathway based on the difference and characteristics of the first subset of anatomical features; and
wherein selecting the first mitigation protocol based on the first abnormality and the first causal pathway comprises selecting the first mitigation protocol configured to limit exacerbation of the first abnormality based on the first causal pathway.

8. The method of claim 1, wherein predicting the first causal pathway comprises:

accessing a diagnostic model linking abnormalities in movement profiles of animals to a set of causal pathways comprising the first causal pathway;

characterizing a first confidence score for the first causal pathway, in the set of causal pathways, based on characteristics of the first abnormality and the diagnostic model; and based on the first confidence score, predicting the first causal pathway for the first abnormality.

9. The method of claim 1:

wherein dispensing the first unit of the primary reinforcer toward the first target location within the working field comprises dispensing the first unit of the primary reinforcer toward the first target location within the working field via actuation of the dispenser occupying a first position corresponding to the first target location; and wherein dispensing the second unit of the primary reinforcer toward the second target location within the working field comprises dispensing the second unit of the primary reinforcer toward the second target location within the working field via actuation of the dispenser occupying a second position corresponding to the second target location.

10. The method of claim 1, wherein dispensing the second unit of the primary reinforcer toward the second target location in response to detecting the animal at the first target location comprises, in response to confirming consumption of the first unit of the primary reinforcer by the animal and in response to detecting the animal within a threshold distance of the first target location, dispensing the second unit of the primary reinforcer toward the second target location.

11. The method of claim 1:

wherein collecting the first timeseries of position data comprises:

at a third time, collecting a first set of feature positions for the set of anatomical features of the animal at a first location, arranged between the first target location and the second target location, on the target pathway, each feature position, in the set of feature positions, corresponding to a particular anatomical feature in the set of anatomical features;

accessing a first time value corresponding to the third time;

at a fourth time, collecting a second set of feature positions for the set of anatomical features of the animal at a second location along the target pathway, the second location arranged between the first location and the second target location; and collecting a second time value corresponding to the fourth time; and wherein deriving the first movement profile based on the first timeseries of position data comprises:

deriving a set of position changes for the set of anatomical features based on the first set of feature positions and the second set of feature positions;

deriving a set of feature position change rates for the set of anatomical features based on the set of feature position changes, the first location, the second location, the first time value, and the second time value; and deriving the first movement profile based on the set of feature position change rates.

12. The method of claim 1:

wherein collecting the first timeseries of position data for the set of anatomical features of the animal comprises:

extracting a first position of a first anatomical feature, in the set of anatomical features, from a first frame in the video feed, the first frame recorded at a third time and depicting the animal at a first location along the target pathway;

extracting a second position of a second anatomical feature, in the set of anatomical features, from the first frame in the video feed;

extracting a third position of the first anatomical feature from a second frame, succeeding the first frame, in the video feed, the second frame recorded at a fourth time, succeeding the third time, and depicting the animal at a second location along the target pathway; and extracting a fourth position of the second anatomical feature from the second frame in the video feed; and wherein deriving the first movement profile for the animal based on the first timeseries of position data comprises:

deriving a first position change, in a set of position changes, for the first anatomical feature based on the first position and the third position;

deriving a second position change, in the set of position changes, for the second anatomical feature based on the second position and the fourth position;

calculating a distance between the first location and the second location;

calculating a time interval between the third time and the fourth time; and deriving the first movement profile for the animal based on the set of position changes, the distance, and the time interval.

13. The method of claim 1, further comprising:

updating the baseline movement profile based on the first movement profile prior to a second training session, succeeding the first training session, for the animal;

during the second training session:

accessing the video feed recorded by the optical sensor integrated into the training apparatus; and in the video feed, detecting the animal in the working field;

at a third time during the second training session, dispensing a third unit of the primary reinforcer toward the first target location within the working field;

at a fourth time succeeding the second time during the second training session, in response to detecting the animal at the first target location, dispensing a fourth unit of the primary reinforcer toward the second target location within the working field; and during a second test period succeeding the fourth time, in response to detecting movement of the animal along the target pathway in the video feed:

collecting a second timeseries of position data representing changes in position of the set of anatomical features of the animal during the second test period;

deriving a second movement profile for the animal based on the second timeseries of position data, the second movement profile representing movement of the animal along the target pathway during the second test period;

characterizing a second difference between the second movement profile and the baseline movement profile; and based on the second difference, characterizing effectiveness of the first mitigation protocol.

* * * * *